US009875143B2

(12) United States Patent
Saito et al.

(10) Patent No.: US 9,875,143 B2
(45) Date of Patent: Jan. 23, 2018

(54) COMPUTER SYSTEM, MANAGEMENT COMPUTER AND MANAGEMENT METHOD

(71) Applicant: Hitachi, Ltd., Tokyo (JP)

(72) Inventors: Gaku Saito, Yokohama (JP); Satoshi Nakamichi, Yokohama (JP); Atsushi Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 224 days.

(21) Appl. No.: 14/648,933

(22) PCT Filed: Dec. 7, 2012

(86) PCT No.: PCT/JP2012/081839
§ 371 (c)(1),
(2) Date: Jun. 2, 2015

(87) PCT Pub. No.: WO2014/087544
PCT Pub. Date: Jun. 12, 2014

(65) Prior Publication Data
US 2016/0019097 A1    Jan. 21, 2016

(51) Int. Cl.
G06F 15/173   (2006.01)
G06F 9/50     (2006.01)
G06F 9/455    (2006.01)
H04L 12/923   (2013.01)
H04L 29/08    (2006.01)

(52) U.S. Cl.
CPC ........ G06F 9/5077 (2013.01); G06F 9/45558 (2013.01); H04L 47/762 (2013.01); H04L 67/10 (2013.01); G06F 2009/4557 (2013.01)

(58) Field of Classification Search
CPC ............. H04L 29/08639; H04L 67/148; G06F 9/45533–9/4558; G06F 9/5507; G06F 2009/45558–2009/45583
See application file for complete search history.

(56) References Cited

U.S. PATENT DOCUMENTS 9,727,368 B1* 8/2017 Tsirkin ................ G06F 9/45558
2008/0244569 A1* 10/2008 Challener ............... G06F 21/57
                                                     718/1
2008/0301487 A1  12/2008 Hatta et al.
(Continued)

FOREIGN PATENT DOCUMENTS

JP    2008-299509 A    12/2008
JP    2010-033404 A    2/2010
(Continued)

Primary Examiner — Brendan Higa
(74) Attorney, Agent, or Firm — Volpe and Koenig, P.C.

(57) ABSTRACT

The purpose of the invention is to simplify the work of setting migration WWNs used in live migration of LPARs. Hypervisor management software of a management computer acquires and stores, in a storage unit, WWNs set for logical FC-HBAs of hypervisors of computers and host information including a WWN of a source capable of accessing a logical unit (LU) of a storage device. The hypervisor management software uses such information as a basis to output, on a display screen, information indicating whether or not a migration WWN, which is a WWN value of a logical FC-HBA used at migration of a virtual computer of the computer, is in a state of being able to be used to access the LU.

9 Claims, 18 Drawing Sheets

(56) References Cited

U.S. PATENT DOCUMENTS

| | | | |
|---|---|---|---|
| 2009/0063749 A1* | 3/2009 | Dow | G06F 12/08 |
| | | | 711/6 |
| 2009/0235249 A1* | 9/2009 | Kobayashi | G06F 11/1497 |
| | | | 718/1 |
| 2010/0031258 A1 | 2/2010 | Takano et al. | |
| 2011/0270945 A1 | 11/2011 | Shiga et al. | |
| 2014/0192804 A1* | 7/2014 | Ghanwani | H04L 49/70 |
| | | | 370/390 |
| 2015/0193248 A1* | 7/2015 | Noel | G06F 9/45558 |
| | | | 718/1 |

FOREIGN PATENT DOCUMENTS

| | | |
|---|---|---|
| JP | 2011-186967 A | 9/2011 |
| JP | 2012-108816 A | 6/2012 |
| WO | 2012-105035 A1 | 8/2012 |

\* cited by examiner

CONFIGURATION DIAGRAM OF COMPUTER (BEFORE EXECUTION OF MIGRATION)

CONFIGURATION DIAGRAM OF COMPUTER (AFTER EXECUTION OF MIGRATION)

FIG.7

| 705 HYPERVISOR SETTING INFORMATION 706 | |
|---|---|
| ITEM NAME | VALUE |
| CHASSIS ID | ID_1.1.1.1 | ~711
| HYPERVISOR IP ADDRESS | 1.2.3.4 | ~712
| HYPERVISOR ID | VM_1.2.3.4 | ~713
| Lpar NO. | 1 | ~714
| VFcID | 1 | ~715
| PORT NUMBER | 0 | ~716
| PHYSICAL PCI NUMBER | E90 | ~717
| Vfc WWN | 1234500067000890(WWN1) | ~718
| MIGRATION WWN | 1234500067800890(WWN1') | ~719

125-1
705 STORAGE DEVICE HOST INFORMATION 706

| ITEM NAME | VALUE | |
|---|---|---|
| STORAGE DEVICE REGISTRATION NAME | STORAGE_01230000 | 720 |
| HOST GROUP PORT NO. | 0A | 725 |
| PORT WWN | 1234500067000890(WWN1) | 726 |
| HOST GROUP NO. | 001 | 727 |
| HOST GROUP NAME | HOST001 | 728 |
| WWW NICKNAME | VM_1.2.3.4-LPAR1 | 729 |

(B)

125-2
705 STORAGE DEVICE HOST INFORMATION 706

| ITEM NAME | VALUE | |
|---|---|---|
| STORAGE DEVICE REGISTRATION NAME | STORAGE_01230000 | 720 |
| HOST GROUP PORT NO. | 0A | 725 |
| PORT WWN | 1234500067800890(WWN1') | 726 |
| HOST GROUP NO. | 001 | 727 |
| HOST GROUP NAME | HOST001 | 728 |
| WWW NICKNAME | VM_1.2.3.4-LPAR1 | 729 |

FIG.10

| 706 HYPERVISOR/STORAGE REGISTERING INFORMATION 706 | |
|---|---|
| ITEM NAME | VALUE |
| CHASSIS ID | ID_1.1.1.1 | ~711
| HYPERVISOR IP ADDRESS | 1.2.3.4 | ~712
| HYPERVISOR ID | VM_1.2.3.4 | ~713
| Lpar NO. | 1 | ~714
| VFcID | 1 | ~715
| PORT NO. | 0 | ~716
| PHYSICAL PCI NUMBER | E90 | ~717
| Vfc WWN | 1234500067000890 (WWN1) | ~718
| Vfc WWN REGISTRATION STATUS | REGISTERED/REGISTRATION STATUS UNKNOWN | ~740
| MIGRATION WWW | 1234500067800890 (WWN1') | ~719
| MIGRATION WWW REGISTRATION STATUS | REGISTERED/UNREGISTERED/REGISTRATION STATUS UNKNOWN | ~741
| STORAGE DEVICE REGISTRATION NAME | STORAGE_01230000 | ~720
| HOST GROUP PORT NO. | 0A | ~725
| HOST GROUP NO. | 001 | ~727
| HOST GROUP NAME | HOST001 | ~728
| VFc WWN NICKNAME | VM_1.2.3.4-LPAR1 | ~742
| MIGRATION WWN NICKNAME | VM_1.2.3.4-LPAR1 | ~743
| CHECK STATUS | CHECKED/UNCHECKED | ~744

FIG.15

| COLUMN NAME | |
|---|---|
| CHASSIS ID | ~1502 |
| IP ADDRESS OF HYPERVISOR | ~1503 |
| ID OF HYPERVISOR | ~1504 |
| Lpar NO. | ~1505 |
| VFcID | ~1506 |
| PORT NUMBER | ~1507 |
| PHYSICAL PCI NUMBER | ~1508 |
| Vfc WWN | ~1509 |
| MIGRATION WWN | ~1510 |

| COLUMN NAME | |
|---|---|
| STORAGE DEVICE REGISTRATION NAME | ~1602 |
| STORAGE DEVICE IP ADDRESS | ~1603 |
| HOST GROUP PORT NO. | ~1604 |
| HOST GROUP NO. | ~1605 |
| HOST GROUP NAME | ~1606 |
| VFc WWN NICKNAME | ~1607 |
| MIGRATION WWN NICKNAME | ~1608 |
| REGISTRATION STATUS OF Vfc WWN IN STORAGE | ~1609 |
| REGISTRATION STATUS OF MIGRATION WWN IN STORAGE | ~1610 |

(table ref: 1601)

FIG. 17

| | HVM ID | LPAR No. | VFC WWN | VFC WWN REGISTRATION STATUS | MIGRATION WWN | MIGRATION WWN REGISTRATION STATUS | HOST GROUP PORT NO. | HOST GROUP NO. | Vfc WWN NICKNAME | MIGRATION WWN NICKNAME |
|---|---|---|---|---|---|---|---|---|---|---|
| ☐ | VM_1.2.3.4 | 1 | 12345000670000890 | ◉ | 12345000670800890 | ◉ | ※ | ※ | ※ | ※ |
| ☐ | VM_1.2.3.4 | 2 | 12345000670000892 | ◉ | 12345000670800892 | ○ | 0A | 002 | VM_1.2.3.4_LPAR2 | VM_1.2.3.4_LPAR2 |
| ☐ | VM_1.2.3.4 | 3 | 12345000670000894 | ◉ | 12345000670800894 | ○ | 0A | 003 | VM_1.2.3.4_LPAR3 | VM_1.2.3.4_LPAR3 |
| ☐ | VM_1.2.3.4 | 4 | 12345000670000896 | ◉ | 12345000670800896 | ◉ | 0A | 004 | VM_1.2.3.4_LPAR4 | VM_1.2.3.4_LPAR4 |
| ☐ | VM_1.2.3.5 | 1 | 12345000680000890 | ◉ | 12345000680800890 | ◉ | ※ | ※ | ※ | ※ |
| ☐ | VM_1.2.3.5 | 2 | 12345000680000892 | ◉ | 12345000680800892 | ○ | 0B | 002 | VM_1.2.3.5_LPAR2 | VM_1.2.3.5_LPAR2 |
| ☐ | VM_1.2.3.5 | 3 | 12345000680000894 | ◉ | 12345000680800894 | ○ | 0B | 003 | VM_1.2.3.5_LPAR3 | VM_1.2.3.5_LPAR3 |
| ☐ | VM_1.2.3.5 | 4 | 12345000680000896 | ◉ | 12345000680800896 | ◉ | 0B | 004 | VM_1.2.3.5_LPAR4 | VM_1.2.3.5_LPAR4 |
| ☐ | VM_1.2.3.6 | 1 | 12345000690000890 | ◉ | 12345000690800890 | ○ | 1A | 001 | VM_1.2.3.6_LPAR1 | VM_1.2.3.6_LPAR1 |
| ☐ | VM_1.2.3.6 | 2 | 12345000690000892 | ◉ | 12345000690800892 | ○ | 1A | 002 | VM_1.2.3.6_LPAR2 | VM_1.2.3.6_LPAR2 |
| ☐ | VM_1.2.3.6 | 3 | 12345000690000894 | ◉ | 12345000690800894 | ○ | 1A | 003 | VM_1.2.3.6_LPAR3 | VM_1.2.3.6_LPAR3 |
| ☐ | VM_1.2.3.6 | 4 | 12345000690000896 | ◉ | 12345000690800896 | ◉ | 1A | 004 | VM_1.2.3.6_LPAR4 | VM_1.2.3.6_LPAR4 |
| ☐ | VM_1.2.3.7 | 1 | 12345000700000890 | ◉ | 12345000700800890 | ○ | 1B | 001 | VM_1.2.3.7_LPAR1 | VM_1.2.3.7_LPAR1 |
| ☐ | VM_1.2.3.7 | 2 | 12345000700000892 | ◉ | 12345000700800892 | ○ | 1B | 002 | VM_1.2.3.7_LPAR2 | VM_1.2.3.7_LPAR2 |

# COMPUTER SYSTEM, MANAGEMENT COMPUTER AND MANAGEMENT METHOD

TECHNICAL FIELD

The present invention relates to a computer system, a management computer and a management method, and more particularly to a computer system including a management computer responsible for control to shift a virtual computer among computers, a management method used in a management computer, a management computer and a computer.

BACKGROUND ART

A computer system in which a plurality of LPARs (Logical Partitions) are mounted on a single physical computer and each LPAR is mounted with an OS (guest OS) to enable the plurality of LPARs to drive a plurality of OSs is available for practical use. Also, there is known a migration technique by which, where an LPAR on one physical computer is to migrate to an LPAR on another physical computer in the active state of the OS in a computer system, the OS on the shift destination LPAR accesses the disk accessed by the OS on the shift origin LPAR immediately after the shifting (see Patent Literature 1).

Among different ways of LPAR migration processing, what causes the shift destination LPAR to succeed the state in which the OS is operating on the shift origin LPAR to enable the OS to continue to operate on the shift destination LPAR is known as live migration.

CITATION LIST

Patent Literature

Patent Literature 1: JP-A No. 2012-108816

SUMMARY OF INVENTION

Technical Problem

In order to realize live migration, a WWN (World Wide Name), which differs with every LPAR without duplication, is allocated to the logical FC-HBA (Fibre Channel-Host Bus Adapter) used in connection with live migration processing. This WWN is called a migration WWN. To make a LU (Logical Unit) of a storage device accessible via the logical FC-HBA allocated to the migration WWN, the migration WWN should be set in the storage device.

Setting of the migration WWN in the storage device is accomplished by using storage management software managing the storage device. On the other hand, information on the migration WWN is information held by a hypervisor on the computer. For this reason, a procedure to manually set the migration WWN with storage management software is used by which information on the migration WWN is referenced by using the hypervisor management software managing the computer. As the work to set this migration WWN is required for every shifting LPAR, it entails much workload when, for instance, many LPARs are to be subjected to live migration.

Solution to Problem

A management computer pertaining to the present invention preferably is configured of a management computer that manages a plurality of computers each having a processor, a memory, a hypervisor that logically splits the processor and the memory to architect a virtual computer, and a plurality of logical adapters allocated by the hypervisor to the virtual computer, and a storage device having a logical unit accessed from the virtual computer via the logical adapters and establishes connection to a display device that displays management information on the computers and the storage device in shift processing of shifting from a first computer to a second computer out of the plurality of computers to the virtual computer, further having a control unit that causes the display device to display first management information for acquiring from the computer an identifier for identifying the virtual computer, a first identifier for identifying a first logical adapter allocated to the virtual computer and a second identifier for identifying a second logical adapter reallocated in connection with the shift processing from the first logical adapter to the virtual computer and managing the first identifier and the second identifier in association with each other; second management information for acquiring from the storage device one or more third identifiers for identifying the logical adapter permitted by the storage device the access from the virtual computer to the logical unit and being managed with respect to each of the third identifiers; and third management information for managing the first management information and the second management information in association with each other, the control unit further referencing the first management information or the third management information, acquiring the second identifier associated with the first identifier, determining whether or not the acquired second identifier is among the third identifiers managed in accordance with the second management information, and causing the determination result to be displayed on the display device.

Further, the invention is grasped as a management method executed by the management computer and as a computer system including the management computer and a plurality of computers.

Advantages Effects of Invention

According to the invention, work required for setting a migration WWN can be made simpler.

BRIEF DESCRIPTION OF DRAWINGS

FIG. 7 is a diagram showing an example of hypervisor setting information in one embodiment.

FIG. 9 is a diagram showing an example of storage device host information in one embodiment.

FIG. 10 is a diagram showing an example of hypervisor/storage registering information in one embodiment.

FIG. 15 is a diagram showing an example of hypervisor information column name list in one embodiment.

FIG. 16 is a diagram showing an example of storage device column name list in one embodiment.

FIG. 17 is a diagram showing an example of displaying in the migration WWN registering screen in one embodiment.

DESCRIPTION OF EMBODIMENTS

In preferable embodiments of the invention, a management computer or a computer system to realize the following control is disclosed. Namely, hypervisor management software provided on the management computer acquires storage device host information including WWNs set in logical FC-HBAs held by the hypervisor of the computer and WWNs that permit access to logical units (LUs) held by storages and devices, stores them into a memory unit and, on the basis of those items of information, outputs to a display screen information on whether or not the migration WWN, which is the WWN of the logical FC-HBA to be used at the time of migration of a virtual computer held by the computer, can access to LUs. If the migration WWN cannot access the LUs, the hypervisor management software adds the migration WWN to the information on whether or not the storage device host information of the storage device by selecting on the screen the pertinent migration WWN and thereby enables the logical FC-HBA for use at the time of migration to access the LU.

The embodiments will be described below with reference to drawings.

Embodiment 1

Figure 1:
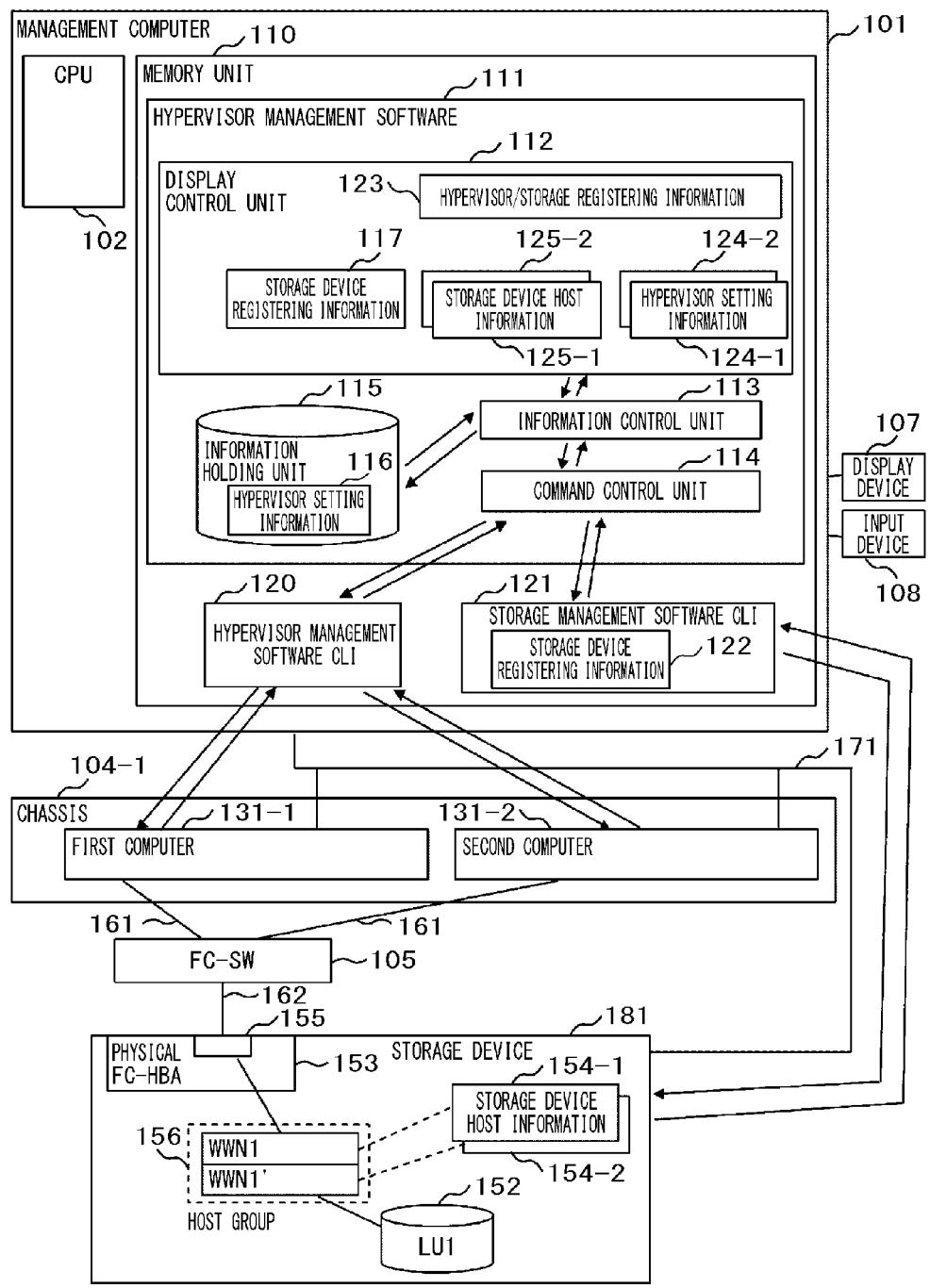
FIG. 1 is an overall configuration diagram of a computer system in one embodiment.

FIG. 1 shows an overall configuration diagram of a computer system. The computer system is configured by the connection of a first computer 131-1 and a second computer 131-2, a management computer 101 and a storage device 181 by a communication network 171. In the illustrated case, the first computer 131-1 and the second computer 131-2 are mounted on the same chassis 104-1, but each may as well be mounted on a separate chassis.

The first computer 131-1 and the second computer 131-2 are connected to the storage device 181 by FC cables 161 and 162 via an FC-SW (Fibre Channel Switch) 105. To add, the FC-SW 105 may as well be replaced by some other switch, or the FC cable 161 may be replaced by some other cable.

The storage device 181 is a disk unit configured of, for instance, an HDD (Hard Disk Drive), a flash memory or the like, and has LUs (Logical Units) 152 into which the disk unit is logically divided. The storage device 181 stores data to be processed by the first computer 131-1 and the second computer 131-2.

The storage device 181 has an FC-HBA (Fiber Channel-Host Bus Adapter) 153 and is connected to a physical FC-HBA 137-1 of the first computer and a physical FC-HBA 137-2 of the second computer via an FC switch 105. To add, some other physical adapter may as well be used in place of the FC-HBA 153.

Connection information indicating what server to which the LU1 (152) is connected is managed by a controller (not shown) in the storage device 181. In this embodiment, log-in from a logical adapter (logical FC-HBA) 138-1 having WWN1 as its identifier or from a logical adapter (logical FC-HBA) 138-2 having WWN1' as its identifier to the LU1 (152) at the time of live migration is permitted. The function to set this connective relationship is called the LUN security function.

A host group 156, which is a logical constituent element defined in a storage device, associates logical FC-HBAs 138-1 and 138-2 communicating over a fibre channel with the LU 152 in the storage device 181. To the host group 156, one or more LUs can be allocated. When the LU 152 is allocated to the host group 156, only logical FC-HBAs having a port WWN 726 set in that host group 156 can access the LU 152. Incidentally, the port WWN 726, whose details will be described afterwards with reference to FIG. 9, is a WWN that is permitted access to the LU 152 by the storage device 181.

Storage device host information sets 154-1 and 154-2 are for management of information on the port WWN 726 in the host group 156. When the storage host information sets 154-1 and 154-2 are added to the host group 156 to which the LU1 (152) is allocated, WWN1 and WWN1' are set as port WWNs 726 to accept the addition as the host. In this case, control is so performed with the controller of the storage device 181 as to accept access to the LU1 (152) only from the FC-HBAs 138-1 and 138-2 to whose FC ports the value of WWN1 and WWN1' are allocated.

For instance, if WWN1 is allocated to an FC port 142-1 of the logical FC-HBA 138-1 and WWN1' to an FC port 142-2 of the logical FC-HBA 138-2, only the logical FC-HBA 138-1 and the logical FC-HBA 138-2 can access the LU1 (152).

Methods of allocating migration WWNs to logical FC-HBAs include one of fixed allocation of WWNs not duplicated among LPARs to individual logical FC-HBAs and another of temporarily allocating a specific WWN common among all LPARs to the logical FC-HBA at the time of its migration as the migration WWN. Here, it is necessary, in order to make the LU accessible from the logical FC-HBA, to set a WWN that makes this access possible. By the former method, as WWNs differing from one LPAR to another are set as WWNs accessible by the LUs, even if access is attempted from any LPAR to an unintended LU, it is possible to physically intercept the attempted access. Unlike that, the latter method would set a common WWN for every LPAR as a WWN that permits access to LUs. As a result, there is the risk of allowing access from some LPAR to an unintended LU. Comparison of the two methods reveals preferability of the former method.

The storage device 181 writes write-in data transmitted from an LPAR1 (100-1) into the LU1 (152), reads out of the LU1 (152) data requested from the LPAR1 (100-1) and sends the data to the LPAR1 (100-1).

Next, the configuration of the computers 131-1 and 131-2 will be described.

Figure 2:
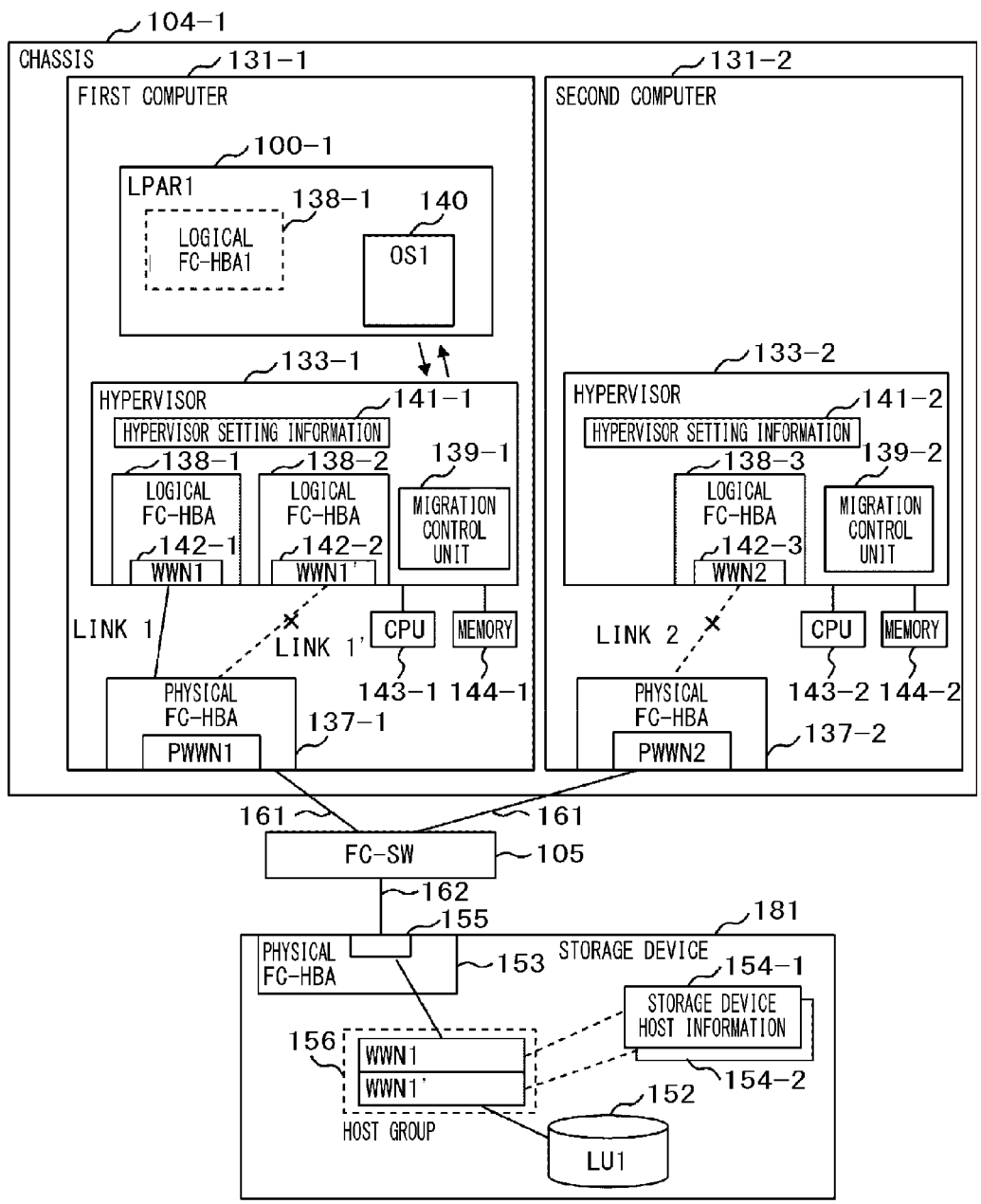
FIG. 2 is a diagram showing the configuration of a computer before the execution of live migration in one embodiment.
Figure 3:
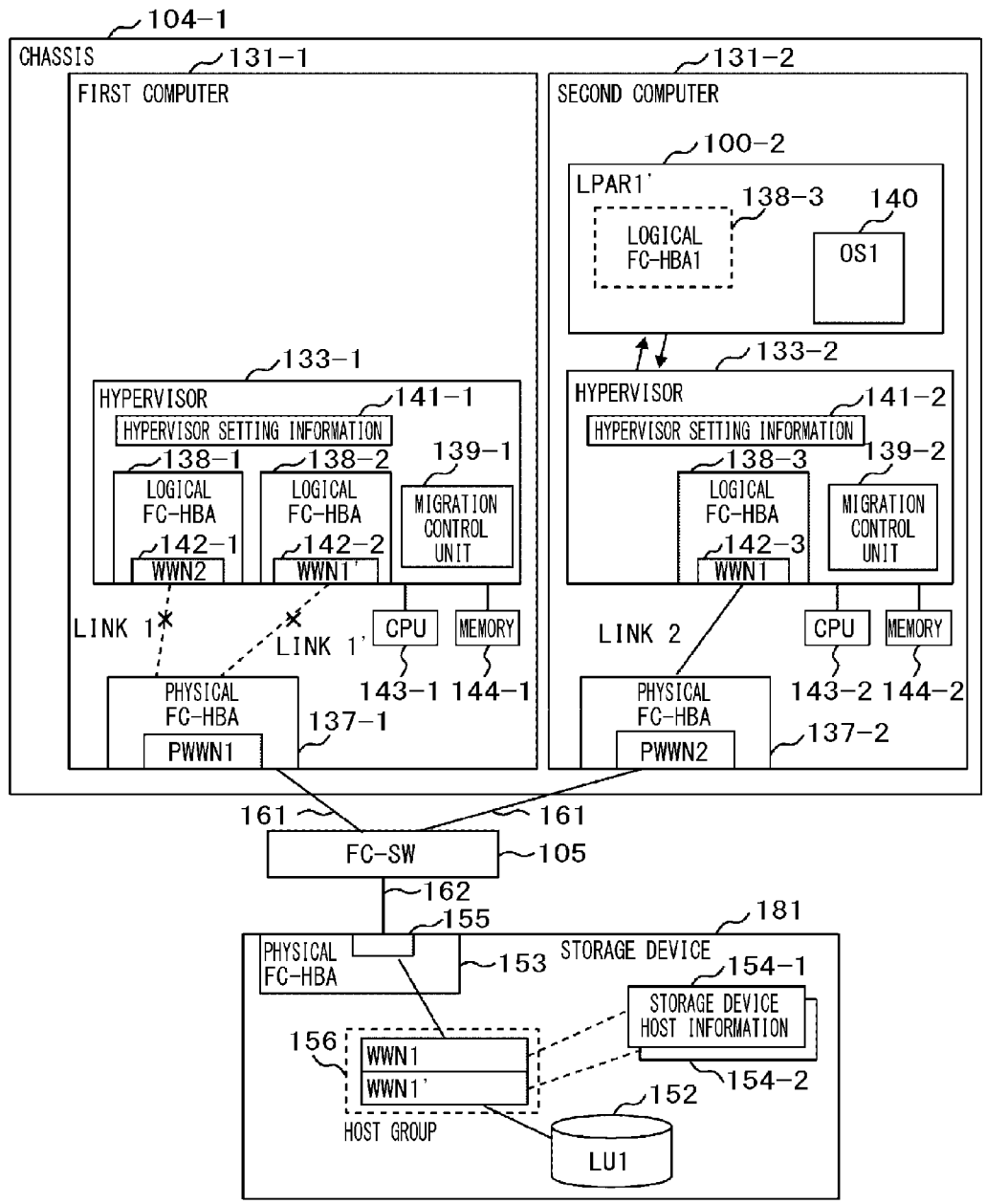
FIG. 3 is a diagram showing the configuration of the computer after the execution of live migration in one embodiment.

As shown in FIG. 2 and FIG. 3, each of the computers 131-1 and 131-2 has a CPU (processor) 143-1, a memory 144-1, a hypervisor 133-1 and a physical FCH-BA 137-1 connected by a path (not shown) permitting bidirectional data transmission, and the CPU 143-1 executes various ways of arithmetic processing by executing programs stored in the memory 144-1. (As the configuration of the computer 131-2 is the same, signs on the computer 131-1 side will be used in the following description).

Although a computer usually is mounted with one OS (host OS), an environment in which a plurality of OSs (guest OSs) can be simultaneously executed can be architected by using the hypervisor 133-1 for realization of a virtualizing function.

For instance, if the CPU (processor) 143-1 and the memory 144-1, which are physical resources, are logically divided by the hypervisor 133-1 to architect the LPAR1 (100-1) and a second LPAR (not shown) as virtual computers on the hypervisor 133-1, the LPAR1 (100-1) and the second LPAR to which physical resources have been allocated by the hypervisor 133-1 can simultaneously execute OSs, which are different from each other. The hypervisor 133-1 manages distribution (allocation) of hardware resources including the CPU 143-1 and the memory 144-1 to the LPARs (or OSs). That is to say, the hypervisor 133-1 allocates appropriately for the situation from time to time physical resources including CPUs and memories to a plurality of guest OSs executed simultaneously. Each guest OS recognizes as real CPUs and memories the resources including virtual-like CPUs and virtual-like memories allocated by the hypervisor 133-1. These virtual-like CPUs and virtual-like memories may be referred to as virtual CPUs and virtual memories.

The hypervisor 133-1 has hypervisor setting information set 141-1, which manages information on the WWNs allocated to the logical FC-HBAs 138-1 and 138-2 that the hypervisor 133-1 has. The hypervisor setting information set 141-1 will be described afterwards with reference to FIG. 7.

The hypervisor 133-1 so controls the physical FC-HBA 137-1 as to make possible transmission of instructions from an OS1 (140) to write in and/or read out data to and from the storage device 181 via the logical FC-HBAs 138-1 and 138-2.

Next, the management computer 101 will be described. The management computer 101 manages the first computer 131-1 and the second computer 131-2.

As shown in FIG. 1, the management computer 101 has a memory unit 110 such as a hard disk device or a semiconductor memory for storing the following software (programs) and various data, a control unit (CPU) 102 for executing software stored in the memory unit 110, a display device (display unit) 107 for displaying various processed data and an input device (input unit) 108 for giving input instructions. To add, the display device (display unit) 107 and the input device (input unit) 108 may as well be external devices connected to the management computer 101. In the illustration, software and various functions realized by its execution are shown within the memory unit 110 for the sake of convenience.

The memory unit 110 stores hypervisor management software 111, hypervisor management software CLI 120 and storage management software CLI 121. The hypervisor management software 111 operating on the management computer 101 is intended to manage the computers 131, the LPARs 100 and the hypervisors 133. And the hypervisor management software 111 has a display control unit 112 that performs processing and calculation for displaying a migration WWN registering screen 1701 on the screen of the display device 107, an information control unit 113 for controlling transfers of information, a command control unit 114 that issues CLI commands to the hypervisor management software CLI 120 and the storage management software CLI 121, and an information holding unit 115 that holds hypervisor setting information 116. CLIs are external interfaces that work on the computers 131-1 and 131-2 and the storage device 181 in accordance with character-based commands. CLI commands are commands consisting of character strings for working on the computers and the storage device 181.

The display control unit 112 has a memory area, and stores (houses) the storage device registering information 117, hypervisor setting information sets 124-1 and 124-2 (hereinafter sometimes referred to as 124 collectively) and storage device host information sets 125-1 and 125-2 (hereinafter sometimes referred to as 125 collectively) in this memory area.

The storage device registering information 117, which is storage device registering information 122 managed by the storage management software CLI 121, is acquired from the storage management software CLI 121 and held in the display control unit 112. The configuration of the storage device registering information 117 will be described afterwards with reference to FIG. 8.

The storage device host information sets 125, which are storage device host information sets 154-1 and 154-2 (hereinafter sometimes referred to as 154 collectively) that the storage device 181 has, is acquired from the storage management software CLI 121 and held in the display control unit 112. The configuration of the storage device host information 125 will be described afterwards with reference to FIG. 9.

The hypervisor setting information sets 124 are hypervisor setting information sets 116 held by the information holding unit 115. The hypervisor setting information sets 116, which are hypervisor setting information sets 141-1 and 141-2 that the hypervisors 133-1 and 133-2 of the first and second computers 131-1 and 131-2 have, are acquired by the hypervisor management software CLI 120 from the hypervisors 133-1 and 133-2. The configuration of the hypervisor setting information sets 124 will be described afterwards with reference to FIG. 7.

The hypervisor management software CLI 120 CLI is software for executing commands issued by the command control unit 114 and making altering and reading requests for the hypervisor setting information sets 141-1 and 141-2 to the hypervisors 133-1 and 133-2.

The storage management software CLI 121 is intended for managing the storage device 181. And the storage management software CLI 121 is software for executing CLI commands issued by the command control unit 114 and making altering and reading requests for the host information sets 154-1 and 154-2 to the storage device 181.

In this embodiment, the hypervisor management software 111 and the storage management software CLI 121 can transmit and receive information via the command control unit 114. Therefore, the hypervisor management software 111 can acquire via the command control unit 114, for instance, the storage device registering information 122 managed by the storage management software CLI 121. In other words, the hypervisor management software 111 is linked with the storage management software CLI 121.

The command control unit 114 has an interface that issues CLI commands to the storage management software CLI 121. The storage management software CLI 121 executes received CLI commands and outputs, as the result of execution, information configured in a storage management software CLI 121 (for instance, character string information) to the command control unit 114. The command control unit 114, receiving the result of execution of CLI commands, analyzes the result of executing the CLI commands, substitutes information in a form permitting storage into the hypervisor management software 111 for the information configured in the format prescribed by the storage management software CLI 121 on the basis of the information in the prescribed format, and outputs it to the information control unit 113.

As the command control unit 114 manages the information in the format prescribed by the storage management software CLI 121 and the information in the format prescribed by the hypervisor management software 111 in association with each other and can substitute the format of the hypervisor management software 111 for the format of the storage management software CLI 121, the hypervisor management software 111 and the storage management software CLI 121 can operate in linkage with each other.

The hypervisor 133-1 has, as logical adapters that can be allocated to the LPAR1 (100-1), the logical FC-HBA 138-1 and the logical FC-HBA 138-2 matching the physical FC-HBA 137-1. However, in this embodiment, the logical FC-HBA 138-1 is a logical adapter allocated to the LPAR1 (100-1) before the shifting of the LPAR1 (100-1). Further, the logical FC-HBA 138-2 is a logical adapter whose allocation is altered along with shift processing (live migration processing) from the logical FC-HBA 138-1 to the LPAR1 (100-1) by the hypervisor 133-1 as a pair partner to the logical 138-1. The hypervisor 133-2 of the second computer 131-2 has a logical FC-HBA 138-3 matching the physical FC-HBA 137-2 as a logical adapter to be allocated to an LPAR 1' (100-2).

FIG. 2 and FIG. 3 respectively show states of the first computer 131-1, which is the shift origin of the LPAR1 (100-1), and the second computer 131-2, which is the shift destination, at the time of live migration. FIG. 2 shows the state before live migration and FIG. 3, the state after live migration. By the processing of live migration, the LPAR 1' (100-2) is caused to succeed the actions of the LPAR1 (100-1) in the operating state of the LPAR1 (100-1).

In FIG. 2, the LPAR1 (100-1) uses the logical FC-HBA 138-1 except at the time of live migration.

To the logical FC-HBA 138-1, WWN1 is allocated as an intrinsic identifier to identify the logical FC-HBA 138-1. To the logical FC-HBA 138-2, in connection with live migration processing at a request for live migration, WWN1', a pair partner to WWN1, is allocated as an intrinsic identifier to identify the logical FC-HBA 138-2 from the time the logical adapter allocated to the LPAR1 (100-1) is altered from the logical FC-HBA 138-1 to the logical FC-HBA 138-2 until the LPAR1 (100-1) is shifted to the second computer to complete the live migration processing.

Here, WWN1' is a WWN allocated to the logical FC-HBA 138-2 as a fixed value in migration processing. This WWN1' will be referred to as migration WWN. Further to the logical FC-HBA 138-3, WWN2 is allocated as an intrinsic WWN to the logical FC-HBA 138-3.

Migration control units 139-1 and 139-2 control migration processing, and issue to constituent units (modules) on the hypervisors 133-1 and 133-2 instructions on processing pertaining to live migration. Further, the migration control unit 139-1 and the migration control unit 139-2 communicate with each other via a network interface and a network switch, and transfer data pertaining to migration between the first computer 131-1 and the second computer 131-2.

To add, though the hypervisors 133-1 and 133-2 are equipped with the migration control units 139-1 and 139-2 in this embodiment, the locations of the migration control units 139-1 and 139-2 are not limited to these.

A link 1, a link 1' and a link 2 respectively represent a logical connection state from the logical FC-HBA 138-1 to the LU1 (152), a logical connection state from the logical FC-HBA 138-2 to the LU1 (152) and a logical connection state from the logical FC-HBA 138-3 to the LU1 (152). The solid line indicated by the link 1 in FIG. 2 represents a state in which FC log-in to the LU1 (152) has completed, namely a state in which the logical FC-HBA 138-1 and the LU1 (152) are logically connected. A broken line indicated by the link 1' and the link 2 represents a state in which FC log-in to the LU1 (152) is absent, namely a state in which the logical FC-HBA 138-2, the logical FC-HBA 138-3 and the LU 303 are logically cut off from one another. In the processing sequence of live migration, the respective log-in states of the link 1, link 1' and link 2 are varied and a state in which the OS1 (140) can continue access to the LU1 (152) is thereby maintained.

The procedure of live migration will be described below.

(1) Before the execution of live migration, namely before the shifting of the LPAR 100-1 from the first computer 131-1, a migration WWN is registered. This is an action to register the WWN1' assigned to the logical FC-HBA 138-2 into the host group 156 to which the LU1 (152) is allocated. By registering the migration WWN' (WWN1'), the logical FC-HBA 138-2 is enabled to process link 1' log-in to the LU1 (152).

(2) The hypervisor 133-1, which is the first computer of the shift origin, alters the link 1 which the logical FC-HBA 138-1 connects to the LU1 (152) via the physical FC-HBA 137-1 to the link 1' which the logical FC-HBA 138-2 connects to the LU via the physical FC-HBA 137-1, and performs log-in processing at the link 1'. The path routing of accessing by the OS1 (140) to the LU1 (152) is altered from the link 1 to the link 1'. Further, the hypervisor 133-1 performs log-out processing of the link 1.

(3) As the link 1 of the shift origin logical FC-HBA 138-1 has logged out, the shift destination logical FC-HBA 138-3 is enabled to use the WWN1 used by the shift origin logical FC-HBA 138-1, and log-in becomes possible at the link 2 of the shift destination logical FC-HBA 138-3. The hypervisor 133-2 uses the WWN1 to perform log-in at the link 2.

The hypervisor 133-1 of the shift origin first computer transmits device/memory information of the LPAR1 (100-1) to the hypervisor 133-2 of the shift destination second computer. The device information includes the types and internal states of logical devices managed within the hypervisor 133-1, and the memory information includes the memory area allocated to the LPAR1 (100-1).

(4) The hypervisor 133-2 of the shift destination second computer reflects the device/memory information on the differential acquired from the shift origin.

(5) At this point of time, the LPAR1' (100-2) has logical devices of the same type as the logical devices previously allocated to the LPAR1 (100-1) in an equal number to the same. To the LPAR 1' (100-2), a logical adapter 142-3 to which WWN1 is assigned is allocated, and the OS1 (140) accesses the LU1 (152) via an access route (link 2) by which the logical adapter 142-3 and the storage device 181 are connected. Further, data in the memory area previously allocated to the LPAR1 (100-1) is duplicated in the memory area allocated to the LPAR1' (100-2) to succeed the state of the OS1 (140) previously operating on the LPAR1 (100-1) to achieve a state in which it can continue to operate on the LPAR1' (100-2). The hypervisor 133-2 causes the logical CPU allocated to the LPAR1' (100-2) to operate, and causes the actions of the LPAR1' (100-2) to start.

(6) The hypervisor 133-1 of the shift origin first computer 131-1 performs log-out processing of the link 1'. Further, it alters the WWN1 allocated to a logical FC-HBA 142-1 to WWN2, cancels LPAR definition, and eliminates allocation of all the logical devices allocated to the LPAR1 (100-1).

Live migration is executed in the procedure described from (1) to (6) above.

Figure 4:
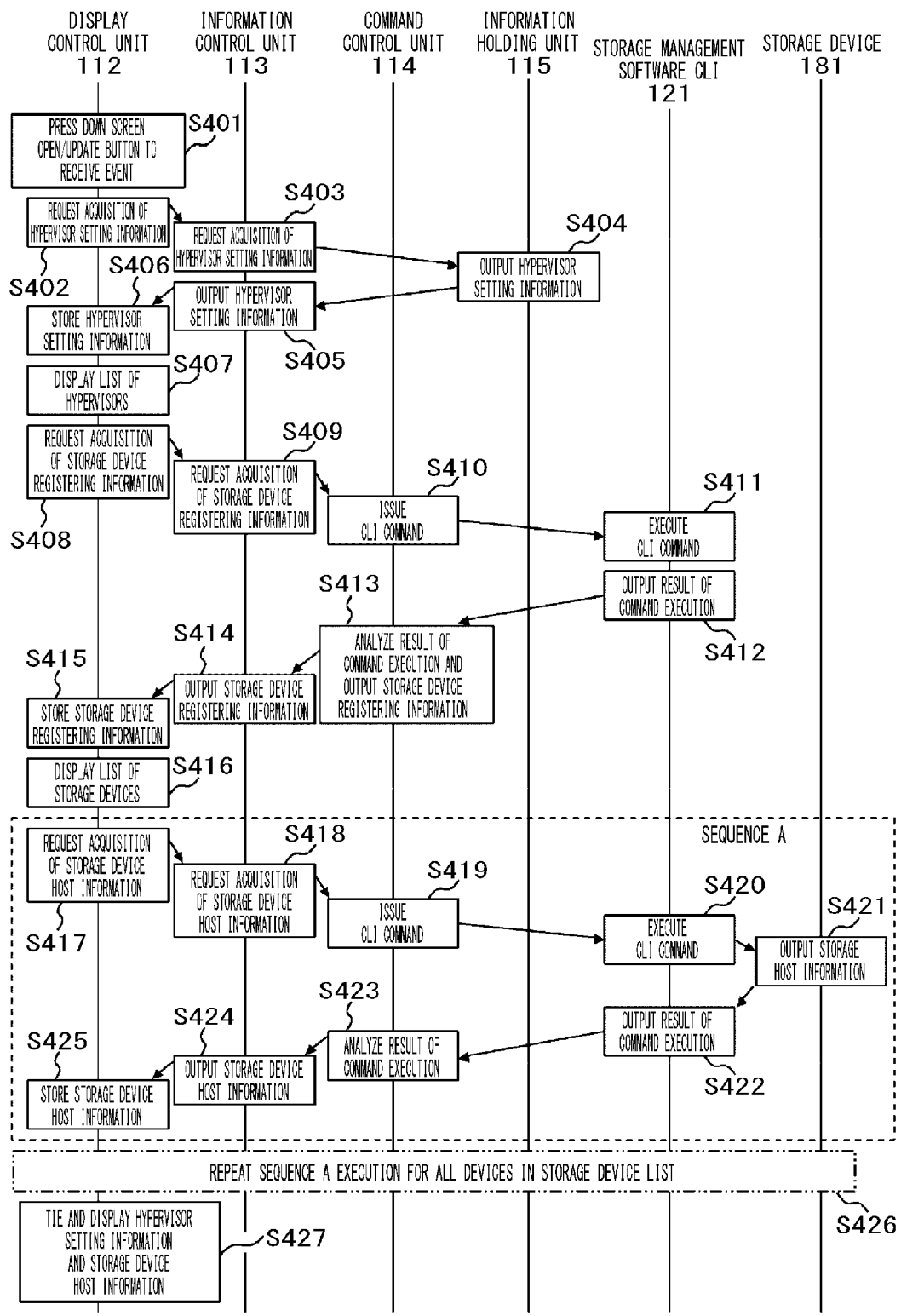
FIG. 4 is a diagram showing the sequence of acquiring information by hypervisor management software in one embodiment.

FIG. 4 shows the sequence of acquisition of the storage device registering information 122, the storage device host information 154 and the hypervisor setting information 116 by the hypervisor management software 111. Processing actions between the display control unit 112 of the information control unit 113, the command control unit 114, the information holding unit 115 and the storage management software CLI 121 of the hypervisor management software 111 on one hand and the storage device 181 on the other will be described below.

The display control unit 112, when it first displays the migration WWN registering screen 1701 (FIG. 17) or when the UpdateInfo button 1702 is clicked, issues a request for acquisition of the hypervisor setting information 116 to the information control unit 113 (S401 and S402).

The information control unit 113, when it has received the request for acquisition of the hypervisor setting information 116, issues to the information holding unit 115 a request for acquisition of the hypervisor setting information 116 (S403).

The information holding unit 115, when it has received the request for acquisition of the hypervisor setting information 116, outputs the hypervisor setting information 116 it holds to the information control unit 113 (S404). The information control unit 113 receives the hypervisor setting information 116, and outputs it to the display control unit 112 (S405).

The display control unit 112, when it has received the hypervisor setting information 116, stores it into the hypervisor setting information 124 (S406). And the display control unit 112 performs control to display the hypervisors 133-1 to 133-N registered in the hypervisor setting information 124 in a hypervisor selection area 1703 within the migration WWN registering screen 1701 (S407).

And the display control unit 112 issues a request to the information control unit 113 to acquire the storage device registering information 122 (S408).

The information control unit 113, when it has received the request for acquisition of the storage device registering information 122, issues a request to the command control unit 114 for acquisition of the storage device registering information 122 (S409).

The command control unit 114, when it has received the request for acquisition of the storage device registering information 122, issues a CLI command to the storage management software CLI 121 (S410). Incidentally, the command control unit 114 has an interface that can issue commands to the storage management software CLI 121.

The storage management software CLI 121 executes the CLI command it has received (S411). And the storage management software CLI 121 outputs to the command control unit 114 the storage device registering information 122 as the execution result of the CLI command in the form of character string information configured in a format prescribed by the storage management software CLI 121.

The command control unit 114, when it has received the execution result of the CLI command, analyzes the execution result of the CLI command, substitutes information in a form permitting storage into the storage device registering information 117 for the information configured in the format prescribed by the storage management software CLI 121 on the basis of the information in the prescribed format, and outputs it to the information control unit 113 (S413).

The information control unit 113, when it has received the storage device registering information 122, outputs it to the display control unit 112 (S414). The display control unit 112, when it has received the storage device registering information 122, stores it into the storage device registering information 117 (S415).

And the display control unit 112 performs such control as to display information on the storage devices 181-1 to 181-N registered in the storage device registering information 117 (storage device list) in a storage device selection area 1704 in the migration WWN registering screen 1701 (S416).

After that, the display control unit 112 issues to the information control unit 113 a request for acquisition of the storage device host information sets 154-1 and 154-2 (S417).

The information control unit 113, when it has received the request for acquisition of the storage device host information sets 154-1 and 154-2, issues a request for acquisition of the storage device host information sets 154-1 and 154-2 to the command control unit 114 (S418).

The command control unit 114 receives the request for acquisition of the storage device host information sets 154-1 and 154-2, and issues a CLI command to the storage management software CLI 121 (S419).

The storage management software CLI 121, when it has received the CLI command, executes that CLI command and issues a request for acquisition of the storage device host information sets 154-1 and 154-2 to the storage device 181.

The storage device 181, when it has received the request for acquisition of the storage device host information sets 154-1 and 154-2, outputs the storage device host information sets 154-1 and 154-2 to the storage management software CLI 121.

The storage management software CLI 121, when it has received the storage device host information sets 154-1 and 154-2, transmits the storage device host information sets 154-1 and 154-2 to the command control unit 114 as the execution result of the CLI command (S422).

The command control unit 114, when it has received the storage device host information, analyzes the execution result of the CLI command, and outputs the storage device host information sets 154-1 and 154-2 to the information control unit 113 (S423).

The information control unit 113 outputs the received storage device host information sets 154-1 and 154-2 to the display control unit 112 (S424).

The display control unit 112 stores the received storage device host information sets 154-1 and 154-2 into the storage device host information 125 (S425).

The display control unit 112, the information control unit 113, the command control unit 114, the information holding unit 115, a storage management software CLI 121 unit and the storage device 181 execute repeatedly, N times, processing steps (S417 to S425) included in sequence A with respect to the storage devices 181-1 to 181-N registered in the storage device registering information 117 (S426).

The display control unit 112 performs processing to associate (tie) the hypervisor setting information 124 with the storage device host information 125 and generates hypervisor/storage registering information 123. This tie processing will be described afterwards with reference to FIG. 13. The display control unit 112 further performs control to make a display in a WWN list 1705 within the migration WWN registering screen 1701 on the basis of the hypervisor/storage registering information 123 (S427). This processing will be described afterwards with reference to a processing flow in FIG. 13.

Figure 5:
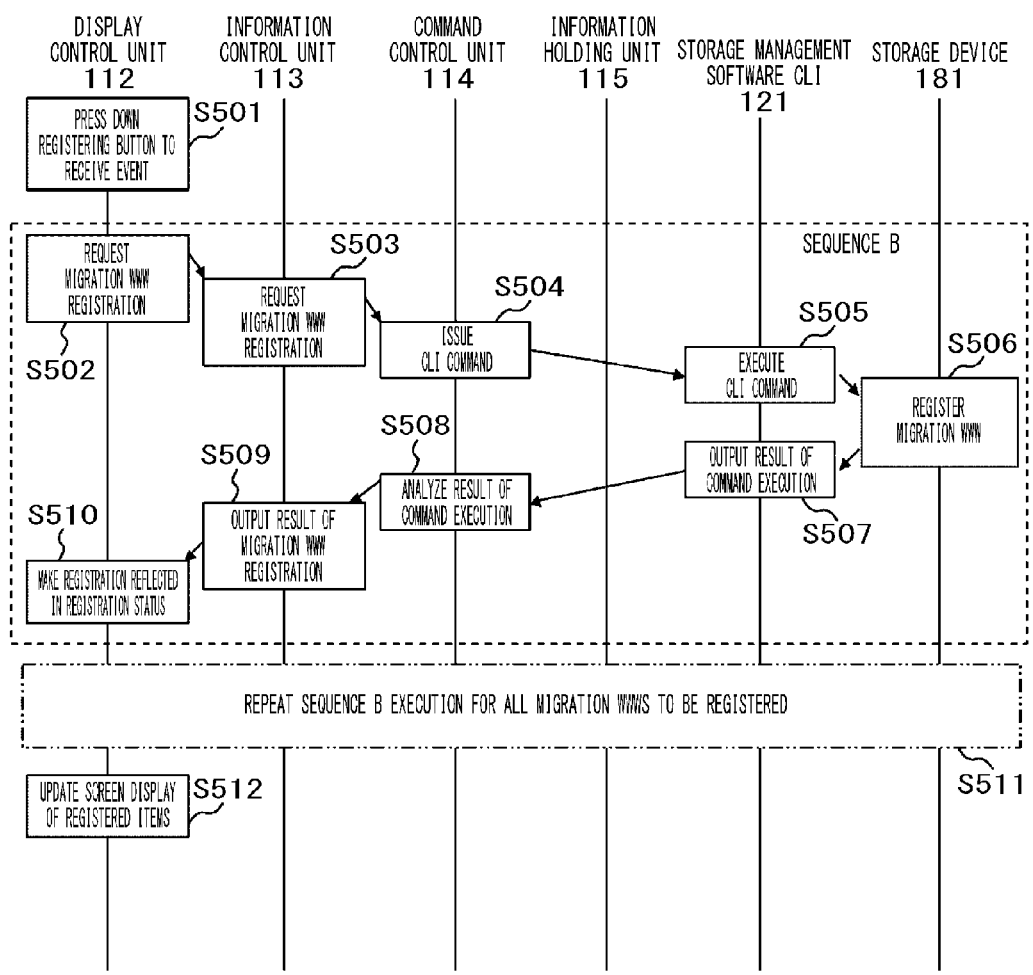
FIG. 5 is a diagram showing the sequence of registering a migration WWN in one embodiment.

FIG. 5 shows a sequence in which the hypervisor management software 111 registers a migration WWN 719 (WWN1') in the hypervisor setting information set 124-1 into the host group 156 that the storage device 181 has. Processing actions with the display control unit 112, the information control unit 113, the command control unit 114, the information holding unit 115, the storage management software CLI 121 and the storage device 181 will be described below.

The display control unit 112, when the Register button 1706 in the migration WWN registering screen 1701 is clicked and if the check status 744 of the hypervisor/storage registering information 123 is "checked", acquires the migration WWN 719 (WWN1') to be registered and the storage device registration name 720 (STORAGE_01230000), the host group port No. 725 (OA) and the host group No. 727 (001) of the registering destination from the hypervisor/storage registering information 123, and issues a request for registration of the migration WWN to the information control unit 113 (S501 and S502).

The request for registration of the migration WWN covers the migration WWN 719 (WWN1') to be registered and the storage device registration name 720 (STORAGE_01230000), the host group port No. 725 (OA) and the host group No. 727 (001) of the registering destination.

The information control unit 113, when it has received the request for registration of a migration WWN, issues a request for registration of the migration WWN to the command control unit 114 (S503). The request for registration of the migration WWN covers the migration WWN 719 (WWN1') to be registered and the storage device registration name 720 (STORAGE_01230000), the host group port No. 725 (OA) and the host group No. 727 (001) of the registering destination.

The command control unit 114, when it has received the request for registration of the migration WWN, issues a CLI command to the storage management software CLI 121 (S504).

The storage management software CLI 121 executes the received CLI command and issues to the storage device 181 a request for registration of the migration WWN (S505). The request for registration of the migration WWN covers the migration WWN 719 (WWN1') to be registered and the storage device registration name 720 (STORAGE_01230000), the host group port No. 725 (OA) and the host group No. 727 (001) of the registering destination.

The storage device 181, when it has received the request for registration of the migration WWN, registers the migration WWN 719 (WWN1') into the host group 156 and generates the storage device host information set 154-2 (S506).

The storage management software CLI 121 outputs the execution result of the CLI command to the command control unit 114 (S507).

The command control unit 114, when it has received the execution result of the CLI command, analyzes the execution result of the CLI command, and transmits the registration result of the migration WWN to the information control unit 113 (S508).

The information control unit 113, when it has received the registration result of the migration WWN, outputs to the display control unit 112 and transmits the registration result of the migration WWN to the display control unit 112 (S509).

The display control unit 112, when it has received the registration result of the migration WWN, registers that registration result of the migration WWN to cause it to be reflected in the migration WWN registration status 741 (FIG. 10) in the hypervisor/storage registering information 123 (S510).

The display control unit 112, the information control unit 113, the command control unit 114, the information holding unit 115, the storage management software CLI 121 and the storage device 181 repeat execution of the processing steps (S502"-'S510) included in sequence B as many times as the number of migration WWNs to be registered (S511).

As a result of these executions, the display control unit 112 performs such control as to update and display the migration WWN registration status 1737 in the WWN list 1705 within the migration WWN registering screen 1701 (S512).

To add, when the migration WWN 719 is registered at processing step S506, a WWN nickname may be set as the WWN nickname 729 (FIG. 9) which the storage device host information set 154-2 is to have. In this case, it is possible to derive such a significant item of information for WWN identification as the ID 713 and the Lpar No. 714 of the hypervisor from the hypervisor setting information set 124-1 in the hypervisor display control unit 112 as a nickname at the execution stage of processing step S502, give the nickname set value as the argument of the command in executing the CLI command when executing processing step S504 and, after CLI command execution at processing step S505, to set the ID 713 and the Lpar No. 714 of the hypervisor as WWN nickname to the WWN nickname 729, which the storage device host information set 154-2 has, at processing step S506.

Figure 6:
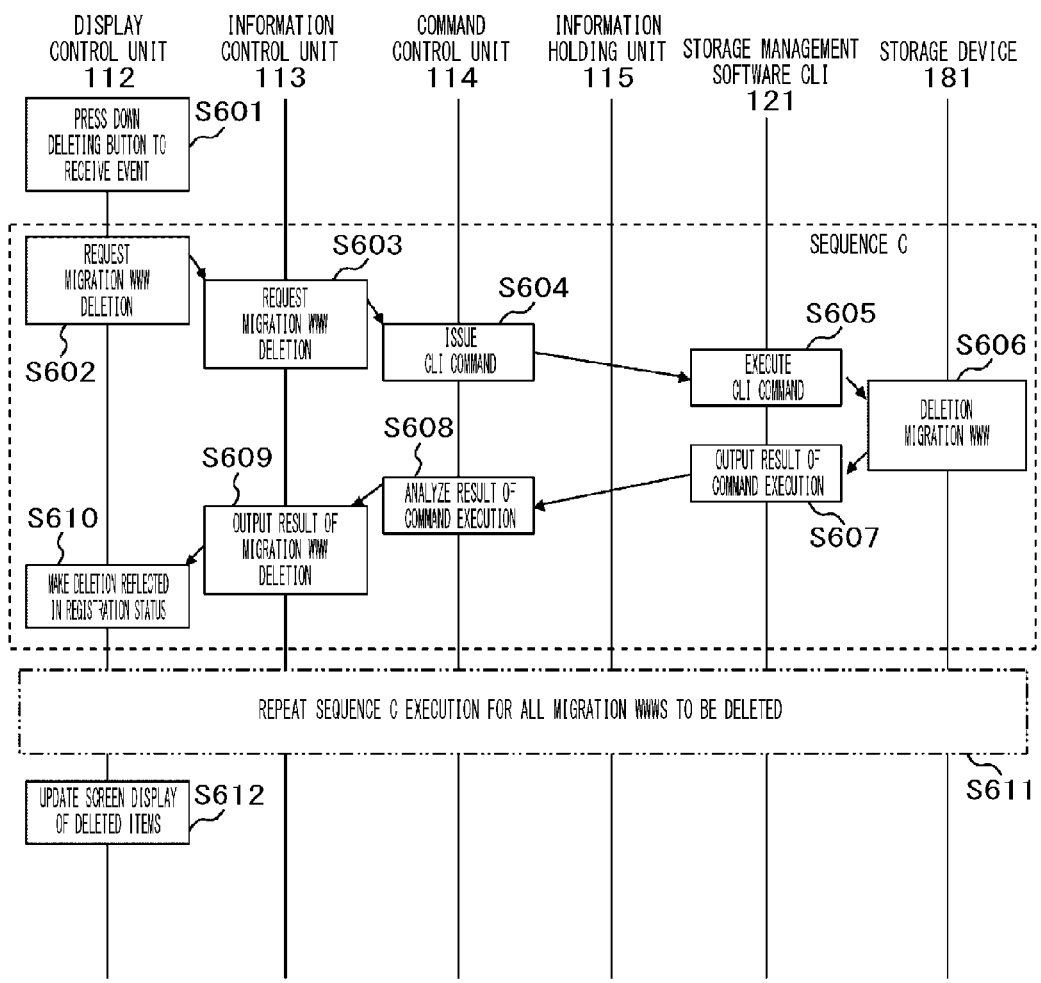
FIG. 6 is a diagram showing the sequence of deleting a migration WWN in one embodiment.

FIG. 6 shows the sequence in which the hypervisor management software 111 deletes from the host group 156, which the storage device 181 has, the migration WWN 719 (WWN1') in the hypervisor setting information set 141-1. Processing actions among the display control unit 112, the information control unit 113, the command control unit 114, the information holding unit 115, the storage management software CLI 121 and the storage device 181 will be described below.

The display control unit 112, when the Unregister button 1707 in the migration WWN registering screen 1701 is clicked and if the check status 744 in the hypervisor/storage registering information 123 is "Checked", acquires the migration WWN 719 (WWN1') to be deleted, the storage device registration name 720 (STORAGE_01230000), the host group port No. 725 (OA) and the host group No. 727 (001) of the deletion object from the hypervisor/storage registering information 123, and issues a request for deletion of the migration WWN to the information control unit 113 (S601 and S602).

The request for deletion of the migration WWN covers the migration WWN 719 (WWN1') to be deleted and the storage device registration name 720 (STORAGE_01230000), the host group port No. 725 (OA) and the host group No. 727 (001) at the destination of deleted items.

The information control unit 113, when it has received the request for deletion of the migration WWN, issues a request for deletion of the migration WWN to the command control unit 114 (S603). The request for deletion of the migration WWN covers the migration WWN 719 (WWN1') to be deleted and the storage device registration name 720 (STORAGE_01230000), the host group port No. 725 (OA) and the host group No. 727 (001) at the destination of deleted items.

The command control unit 114, when it has received the request for deletion of the migration WWN, issues a CLI command to the storage management software CLI 121 (S604).

The storage management software CLI 121 executes the received CLI command, and issues a request for deletion of the migration WWN to the storage device 181 (S605). The request for deletion of the migration WWN covers the migration WWN 719 (WWN1') to be deleted and the storage device registration name 720 (STORAGE_01230000), host group port No. 725 (OA) and host group No. 727 (001) at the destination of deleted items.

The storage device 181, when it has received the request for deletion of the migration WWN, subjects the host group 156 to deletion of the migration WWN 719 (WWN1') (S606).

And the storage management software CLI 121 out puts the execution result of the CLI command to the command control unit 114 (S607).

The command control unit 114, when it has received the execution result of the CLI command, analyzes the execution result of the CLI command and transmits the result of migration WWN deletion to the information control unit 113 (S608).

The information control unit 113, when it has received the result of migration WWN deletion, transmits the result of migration WWN deletion to the display control unit 112 (S609).

The display control unit 112, when it has received the result of migration WWN deletion, registers the result of migration WWN deletion so as to cause it to be reflected in the registration status 741 of the migration WWN (FIG. 10) in the hypervisor/storage registering information 123 (S610).

The display control unit 112, the information control unit 113, the command control unit 114, the information holding unit 115, the storage management software CLI 121 unit and the storage device 181 repeat execution of the processing steps (S602 to S610) included in sequence C as many times as the number of migration WWNs to be deleted (S611).

As a result of these executions, the display control unit 112 performs such control as to update and display the migration WWN registration status in the WWN list 1705 within the migration WWN registering screen 1701 (S612).

FIG. 7 shows an example of the hypervisor setting information set 124-1.

The hypervisor setting information set 124-1 is management information resulting from acquisition of the hypervisor setting information set 141-1, which the hypervisor 133-1 has, from the hypervisor management software CLI 120 and storing it into the hypervisor setting information set 124-1 within the display control unit 112. Here, the hypervisor setting information set 124-1 is represented by the item name 705 of each data set and its specific value 706 (the representation form in FIGS. 8 to 10 below will be the same).

The hypervisor setting information set 124-1 is management information for managing, under the item name 705 pertaining to the setting of information on the hypervisor 133-1, a chassis ID 711, a hypervisor IP address 712, a hypervisor ID 713, the Lpar No. 714, a VFc ID 715, a port No. 716, a physical PCI No. 717, a Vfc WWN 718 and the migration WWN 719 in association with one another.

The chassis ID 711 is ID information a chassis has for the purpose of identifying the chassis.

The hypervisor IP address 712 is IP address information for having communication with the hypervisor. The hypervisor ID 713 is an ID value that the hypervisor has for the purpose of identifying the hypervisor. The Lpar No. 714 is an identifier (No.) for identifying the LPAR.

The VFc ID 715 is VFc ID information on a shared FC allocated to the LPAR. The port No. 716 is port No. information for identifying a logical FC-HBA port. The physical PCI No. 717 is a No. for identifying a physical FC-HBA.

The VFc WWN 718 is an intrinsic identifier WWN assigned to each logical FC-HBA port. As illustrated, [1234500067000890] is set to the WWN1 of the VFc WWN 718.

The migration WWN 719 is an intrinsic identifier WWN for use in live migration processing, assigned in the form of a pair partner to the VFc WWN 718. To the WWN1' of the migration WWN 719, [1234500067800890] is set.

Figure 8:
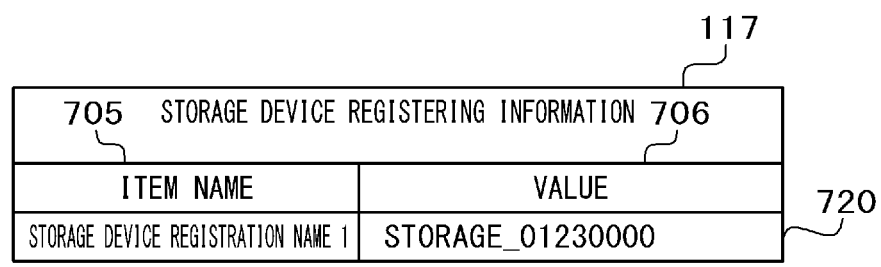
FIG. 8 is a diagram showing an example of storage device registering information in one embodiment.

FIG. 8 shows an example of storage device registering information 117. The storage device registering information 117 results from acquisition of the storage device registering information 122 managed by the storage management software CLI 121 from the storage management software CLI 121 and its storage into the storage device registering information 117 within the display control unit 112. In the presence of a plurality of storage devices, the storage management software CLI 121 holds a plurality of storage device registering information sets and the storage management software CLI 121 acquires a plurality of the storage device registering information sets 122 and stores them into the storage device registering information 117.

The storage device registering information 117 has, as an item name 705 pertaining to registering information on the storage devices, the storage device registration name 1 (720), which is a registration name for identifying the storage device. In this case, [STORRAGE 0123000] is set as the storage device registration name 1.

FIG. 9 shows an example of storage device host information 125.

The storage device host information 125 is management information resulting from acquisition of storage device host information sets 154-1 and 154-2, which the storage device 181 has, by the storage management software CLI 121 and its holding as storage device host information, and its further acquisition from the storage management software CLI 121. The storage device host information set 125-1 shown in FIG. 9 (A) matches the storage device host information set 154-1, and the storage device host information set 125-2 shown in FIG. 9 (B) matches the storage device host information set 154-2.

The storage device host information 125 is management information for managing as item names 705 pertaining to the host information, which the storage device 181 has, the storage device registration name 1 (720), the host group port No. 725, the port WWN 726, the host group No. 727, a host group name 728 and the WWN nickname 729 in association with one another.

The host group port No. 725 is a No. for identifying a port 155 to which the host group 156 is allocated.

The port WWN 726 is a WWN whose access to the LU 152 is permitted by the storage device 181. When the LU 152 is accessed from LPAR 100-1 via the logical FC-HBA 138-1 or the logical FC-HBA 138-2, the storage device 181 permits access to the LU 152 on the basis of the port WWN 726. The port WWNs 726 in the storage device host information sets 154-1 and 154-2 are WWN1 and WWN 1', respectively.

The host group No. 727 is the No. for identifying the host group 156.

The host group name 728 is the value of the name set to the host group 156. The WWN nickname 729 is a name set for each WWN to facilitate identification of the WWN.

To add, when the storage device 181 is to permit a plurality of WWNs to access the LU 152 or, more specifically, when the storage device 181 is to permit the WWN1 and WWN1' to access the LU 152, as the storage device host information 125, the storage device host information 125 (A) and the storage device host information 125 (B) are created for each of the WWN1 and WWN1' to which access is permitted.

FIG. 10 shows an example of hypervisor/storage registering information 123.

The hypervisor/storage registering information 123 is management information for managing the registration statuses of the VFc WWN 718 (WWN 1) and the migration WWN 719 (WWN 1') in the storage device host information 125.

The hypervisor/storage registering information 123 is created by tie processing by (see FIG. 13) by the hypervisor setting information 124 and the storage device registering information 117 on the basis of the hypervisor setting information 124, storage device registering information 117 and storage device host information 125. The hypervisor/storage registering information 123 is generated according to the number of logical FC-HBAs simultaneously allocated to the LPAR that the hypervisors 133-1 and 133-2 have.

The hypervisor/storage registering information 123 is management information for managing as item names 705 the chassis ID 711, the hypervisor IP address 712, the hypervisor ID 713, the Lpar No. 714, the VFcID 715, the port No. 716, the physical PCI No. 717, the VFc WWN 718, the VFc WWN registration status 740, the migration WWN 719, the migration WWN registration status 741, the storage device registration name 720, the host group port No. 725, the host group No. 727, the host group name 728, the VFc WWN nickname 742, the migration WWN nickname 743 and the check status 744 in association with one another.

The VFc WWN registration status 740 indicates whether or not there is storage device host information 125 having a port WWN 726 that is identical to the VFc WWN 718 in the hypervisor setting information 124 or the hypervisor/storage registering information 123. As the VFc WWN registration status 740, "registered" or "registration status unknown" is shown.

The migration WWN registration status 741 indicates whether or not there is storage device host information 125 having a port WWN 726 that is identical to the migration WWN 719 in the hypervisor setting information 124 or the hypervisor/storage registering information 123. As the migration WWN registration status 741, "registered", "unregistered" or "registration status unknown" is shown.

The VFc WWN nickname 742 is the WWN nickname 729, which the storage device host information set 125-1 has, having a port WWN 726 that is identical to the migration WWN 719 in the hypervisor setting information 124 or the hypervisor/storage registering information 123.

The migration WWN nickname 743 is a WWN nickname 729, which the storage device host information 125-2 has, having a port WWN 726 identical to the migration WWN 719 in the hypervisor setting information 124 or the hypervisor/storage registering information 123.

Figure 11:
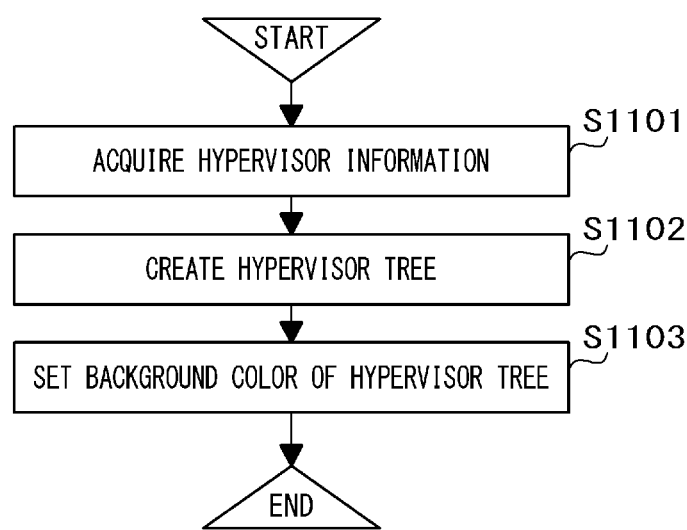
FIG. 11 is a flow chart showing processing to display a hypervisor selection area in a migration WWN registering screen in one embodiment.

FIG. 11 charts processing to display the hypervisor selection area 1703 in the migration WWN registering screen 1701. This processing is executed by the display control unit 112 of the hypervisor management software 11.

The check status 744 stores the check status of a check box 1731, which the migration WWN registering screen 1701 has. As the check status, "Checked" or "Unchecked" is indicated. The check status 744 is updated, when the status of the check box 1731 changes, according to the status.

Step 1101: The display control unit 112 acquires the hypervisor setting information 116 and stores it into the hypervisor setting information 124.

Step 1102: The display control unit 112 displays the hypervisors 133-1 to 133-N in the hypervisor selection area 1703 in the migration WWN registering screen 1701.

Step 1103: The background color of the hypervisor selection area 1703 is set to color A.

In the hypervisor selection area 1703 whose background color is color A, a plurality of chassis 104-1 and 104-2 and N hypervisors 133-1 to 133-N mounted on the chassis 104-1 are displayed.

Figure 12:
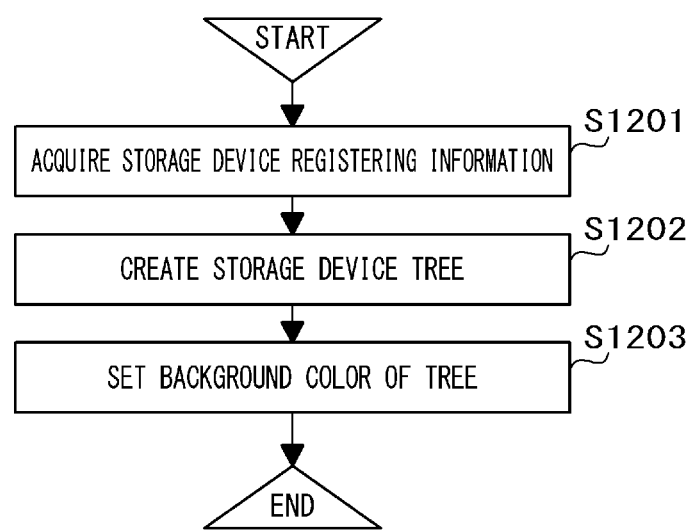
FIG. 12 is a flow chart showing processing to display a storage device selection area in a migration WWN registering screen in one embodiment.

FIG. 12 charts processing to display the storage device selection area 1704 in the migration WWN registering screen 1701. This processing is executed by the display control unit 112 of the hypervisor management software 111.

Step 1201: The display control unit 112 acquires the storage device registering information 122 and stores it into the storage device registering information 117.

Step 1202: The display control unit 112 displays the storage device 181-1 to 181-N in the storage device selection area 1704 within the migration WWN registering screen 1701.

Step 1203: The background color of the storage device selection area 1704 is set to color B.

In the storage selection area 1704 whose background color is color B, N storage devices 181-1 to 181-N are displayed.

Figure 13:
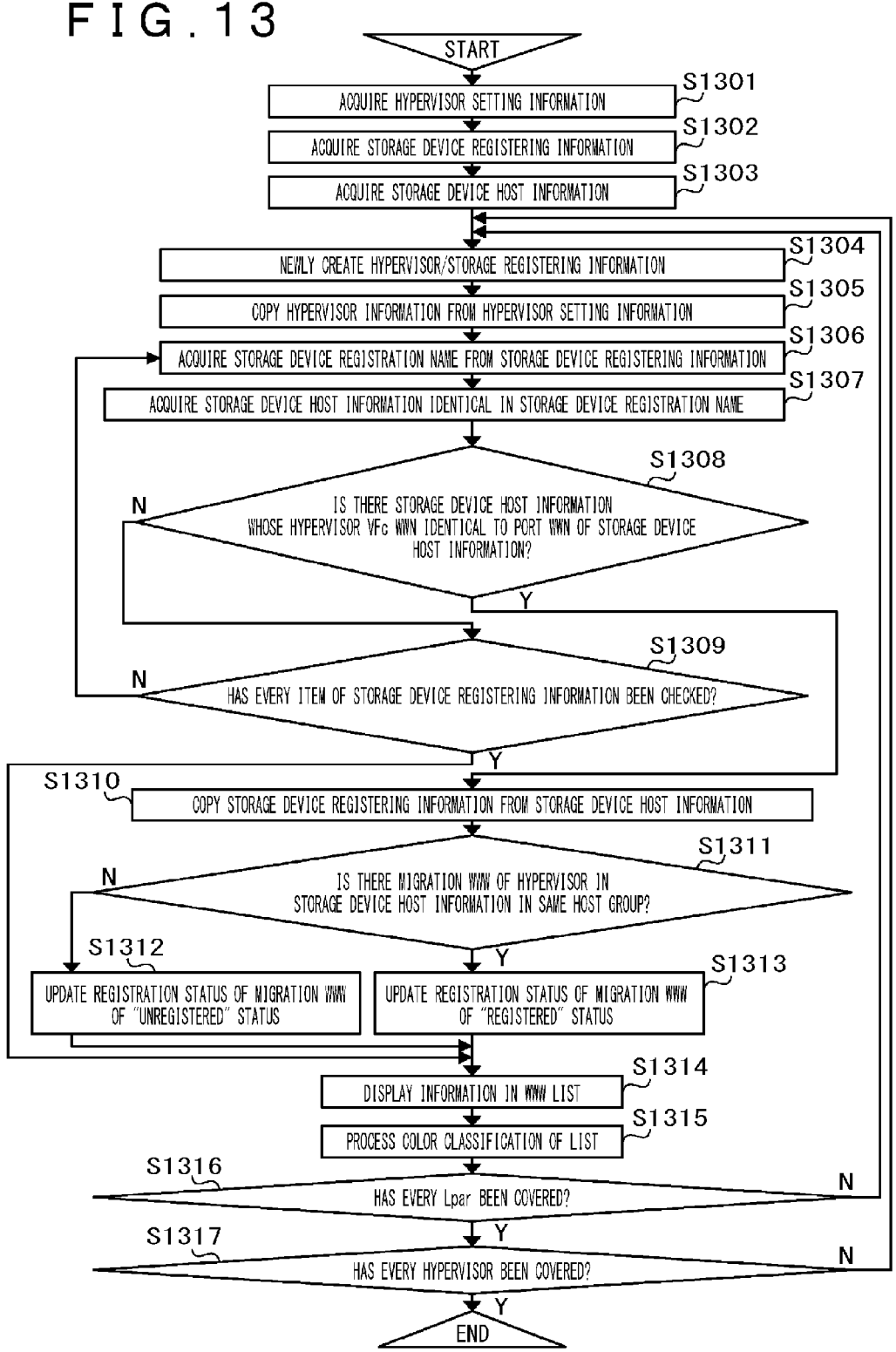
FIG. 13 is a flow chart showing processing to tie hypervisor setting information and storage device host information in one embodiment.

FIG. 13 charts processing to tie the hypervisor setting information 124 and the storage device host information 125. This processing is executed by the display control unit 112 of the hypervisor management software 111 when the migration WWN registering screen 1701 (FIG. 17) is to be first displayed or when the UpdateInfo button 1702 is clicked (S401).

Step 1301: The display control unit 112 acquires the hypervisor setting information 116 from the information holding unit 115. This Step 1301 corresponds to the processing from Step 402 to Step 406.

Step 1302: The display control unit 112 acquires the storage device registering information 122 from the storage management software 121 and stores it into the storage device registering information 117. To add, in the presence of a plurality of storage devices 181, a storage device registration name is stored into each of the multiple storage device registering information sets 117. This Step 1302 corresponds to the processing from Step 408 to Step 415.

Step 1303: The display control unit 112 issues a request for acquisition of storage device host information to the storage management software CLI 121 via the command control unit 114, further acquires the storage device host information sets 154-1 and 154-2 from the storage device 181 via the storage management software CLI 121, and stores them into the storage device host information sets 125-1 and 125-2. To add, in the presence of a plurality of storage devices 181, from each of the multiple storage device registering information sets 117, its storage device host information is acquired and stored into the storage device host information 125. This Step 1303 corresponds to the processing from Step 417 to Step 426.

Step 1304: The display control unit 112 starts newly creating hypervisor/storage registering information 123. The values 706 of the hypervisor/storage registering information 123 are supposed to be initial values.

Step 1305: The display control unit 112 copies into (inputs to) the hypervisor/storage registering information 123 created at Step 1304 the chassis ID 711, the hypervisor IP address 712, the hypervisor ID 713, the Lpar No. 714, the VFc ID 715, the port No. 716, the physical PCI No. 717, the VFc WWN 718 and the migration WWN 719, the migration WWN registration status 741, the storage device registration name 720, the host group port No. 725, the host group No. 727, the host group name 728, the VFc WWN nickname 742, the migration WWN nickname 743 and the check status 744 of the hypervisor setting information 124. The pertinent items of the hypervisor/storage registering information 123 are updated from their initial values to the values 706 of the hypervisor setting information 124.

Step 1306: the display control unit 112 acquires the storage registration name 1 (720) from the storage device registering information 117. To add, in the presence of a plurality of storage devices, processing of Steps 1306 to 1309 is repeated for the storage registration names 2 to N of a plurality of storage device registering information sets 117.

Step 1307: The display control unit 112 acquires storage device host information in which the storage device registration name acquired at Step 1306 is identical to the storage device registration name 720. Namely tying of the storage device registering information 117 and the storage host information set 125-1 is accomplished according to the storage device registration name.

Step 1308: The display control unit 112 references the hypervisor/storage registering information 123, and acquires the "WWN1" of the VFc WWN 718 with respect to a certain LPAR. To add, the display control unit 112 may as well reference the hypervisor setting information 124 and acquire the "WWN1" of the VFc WWN 718. The display control unit 112 determines whether or not a storage host information set 125-1 having a port WWN 726 identical to the acquired "WWN1" of the VFc WWN 718 exists. Namely, tying of the hypervisor/storage registering information 123 and the storage device host information set 125-1 is accomplished according to the "WWN1" of the VFc WWN 718.

If the determination at Step 1308 declares "inexistent: N", the processing moves ahead to Step 1309. To add, if the determination at Step 1308 reveals absence of storage device host information whose port WWN 726 is identical to the VFc WWN 718, the registration status 740 of the VFc WWN and the registration status 741 of the migration WWN remain "registration status unknown", which are their initial values. If the determination at Step 1308 declares "existent: Y", the processing moves ahead to Step 1310.

Step 1309: Supposing the presence of a plurality of storage devices 181, it is determined whether or not every storage registering information set 117 has undergone processing.

If the determination at Step 1309 declares that "not every storage registering information set 117 has undergone processing", the processing returns to Step 1306. If the determination at Step 1309 declares that "every storage registering information set 117 has undergone processing", the processing moves ahead to Step 1314.

Step 1310: If the determination at Step 1308 reveals the presence of a storage device host information set 125-1 having a VFc WWN 718 identical to the port WWN 726, the display control unit 112 copies (inputs), on the basis of the identical storage device host information set 125-1, the storage device registration name 1 (720), the host group port No. 725, the host group No. 727, the host group number 728, the VFc WWN nickname 742 and the migration WWN nickname 743 of the hypervisor/storage registering information 123. Further, the registration status 740 of the VFc WWN is set to the registered status. Pertinent items of the hypervisor/storage registering information 123 are updated from their initial values to the values 706 of the storage device host information set 125-1.

Step 1311: The display control unit 112 references the hypervisor/storage registering information 123, and acquires the "WWN1'" of the migration WWN 719 and "001" of the host group No. 727 associated with the VFc WWN 718 with respect to a certain LPAR. To add, the display control unit 112 may as well reference the hypervisor setting information 124 and acquire the "WWN1'" of the migration WWN 719 associated with the Vfc WWN 718. Also, a host group number 727 associated with a port WWN 726 identical to the acquired "WWN1'" of the VFc WWN 718 may be acquired from the storage device host information set 125-1.

The display control unit 112 references the storage device host information set 125-1, and determines whether or not there is in the storage device host information 125 storage host information having a host group No. 727 identical to the "001" of the acquired host group No. 727 and having a port WWN 726 identical to the "WWN1'" of the acquired migration WWN 719. Namely, tying of the hypervisor/storage registering information 123 and the storage device host information 125-2 is accomplished according to the value of the "WWN1'" of the migration WWN 719 and "001" of the host group No. 727.

Step 1312: If the determination at Step 1311 reveals that the host group No. 727 and the migration WWN 719 are not identical, the display control unit 112 updates the registration status 741 of the migration WWN in the hypervisor/storage registering information 123 to "unregistered". The "unregistered" registration status 741 of the migration WWN is registering information indicating that the acquired migration WWN 719 "WWN1'" is not included in the storage device host information 125 having a host group No. 727 identical to "001" of the acquired host group No. 727.

Step 1313: If the determination at Step 1311 reveals that the host group No. 727 and the migration WWN 719 are identical, the display control unit 112 updates the registration status 741 of the migration WWN in the hypervisor/storage registering information 123 to "registered". The "registered" registration status 741 of the migration WWN is registering information indicating that the acquired migration WWN 719 "WWN1'" is included in the storage device host information 125 having a host group No. 727 identical to the acquired host group No. 727 "001".

Step 1314: The display control unit 112 adds a new line to the WWN list 1705 in the migration WWN registering screen 1701, and displays relevant values in a copied form on the basis of the hypervisor/storage registering information 123.

The display control unit 112 associates the Lpar No. 714 acquired from the hypervisor/storage registering information 123 and the value of the registration status 741 of the migration WWN, and displays them in the WWN list 1705 within the migration WWN registering screen 1701. The display control unit 112 may as well reference the hypervisor setting information 124 and acquire the Lpar No. 714. Further, the registration status 741 of the migration WWN may be displayed in characters or in icons, signs or the like as shown in FIG. 17.

Displaying of the Lpar No. 714 and the registration status 741 of the migration WWN enables the user to know the registration status of the migration WWN with respect to LPAR identified by the displayed Lpar No. 714. For this reason, the user can easily judge whether or not the migration WWN requires registration, the migration WWN may be deleted and live migration can be executed.

If, for instance, the registration status 741 of the migration WWN indicates "registered", no work to register the migration WWN is required, the migration WWN can be deleted, and live migration can be executed. If the registration status 741 of the migration WWN indicates "unregistered", execution of live migration requires work to register the migration WWN.

If the registration status 741 of the migration WWN and the VFc WWN indicate "registration status unknown", no information on any accessible host group for LPAR identified by the displayed Lpar No. 714 is made available, or it means the absence of any accessible host group for LPAR.

Further, if only one line has been displayed on the WWN list 1705 within the migration WWN registering screen 1701 shown in FIG. 17, new information sets 1731 to 1741 will be displayed in a new WWN on a newly added second line.

Step 1315: The WWN list 1705 within the migration WWN registering screen 1701 undergoes color classification processing of the list with hypervisor information and storage information. This processing will be described afterwards with reference to FIG. 14. Color classification processing of the list with hypervisor information and storage information facilitates understanding by the user. To add, this color classification processing is not indispensable for processing to tie the hypervisor setting information 124 and the storage device host information 125.

Step 1316: In the presence of a plurality of LPARs, it is determined whether or not a given LPAR is the final one and, if not the final LPAR, processing from Step 1304 is repeated for the next LPAR. If it is the final LPAR, the processing moves ahead to Step 1317.

Step 1317: In the presence of a plurality of hypervisors, it is determined whether or not a given hypervisor is the final one and, if not the final hypervisor, processing from Step 1304 is repeated for each LPAR defined by each next hypervisor. If it is the final hypervisor, the processing ends.

By the processing charted in FIG. 13, for all the LPARs on every hypervisor the hypervisor/storage registering information 123 matching each LPAR is generated. Further, relevant values are displayed for the WWN list 1705 within the migration WWN registering screen 1701 in a copied form on the basis of the hypervisor/storage registering information 123.

Figure 14:
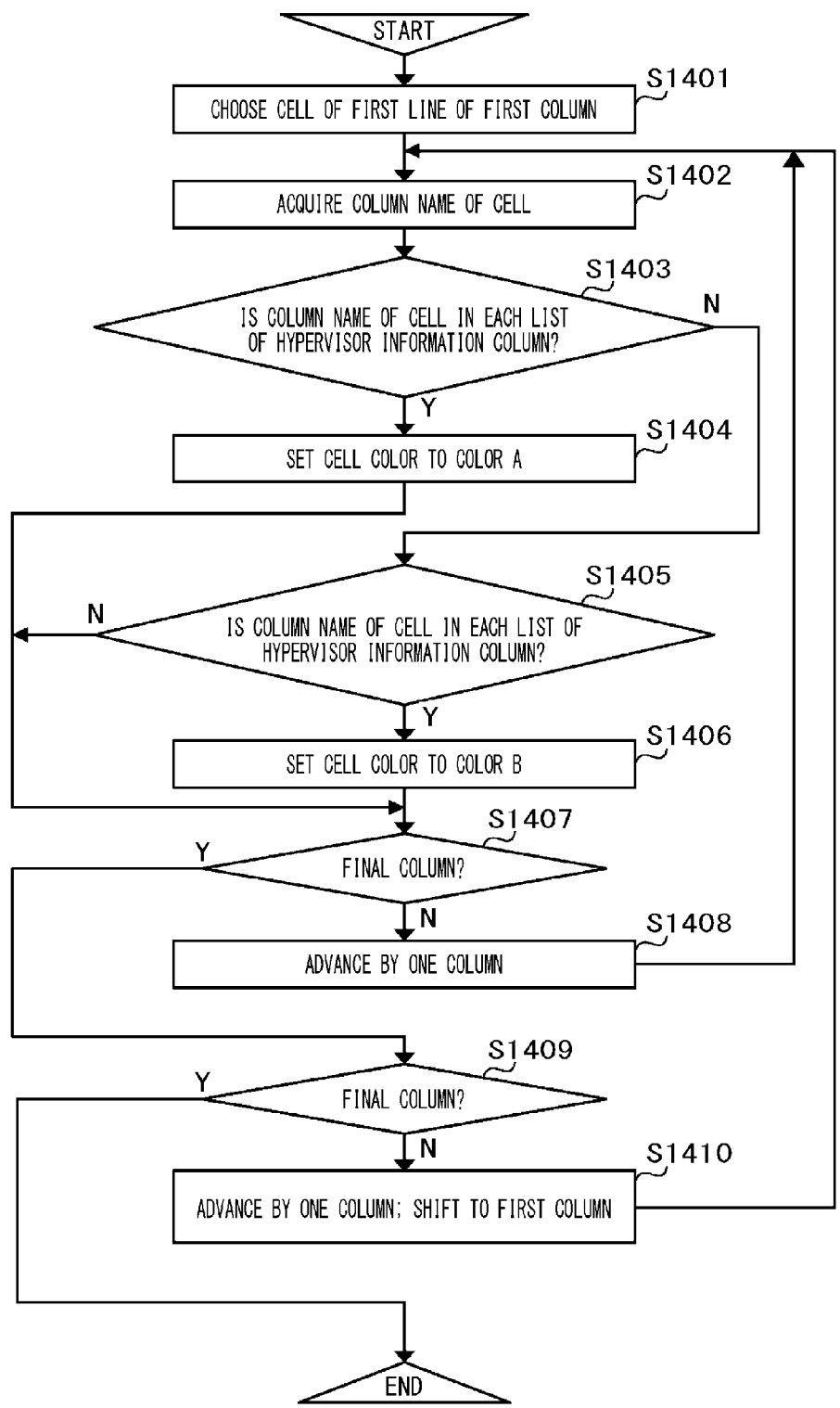
FIG. 14 is a flow chart showing color classification processing in a migration WWN registering screen in one embodiment.

FIG. 14 shows color classification processing of the table of the WWN list 1705 in the migration WWN registering screen 1701. This processing is executed by the display control unit 112 of the hypervisor management software 111.

Step 1401: The cell on the first line of the first column of the WWN list 1705 is chosen.

Step 1402: A column name is acquired for the chosen cell.

Step 1403: It is determined whether or not the column name acquired at Step 1402 is included in a hypervisor information column name list 1501 (see FIG. 15).

Step 1404: The background color of the cell chosen from the WWN list 1705 is set to color A.

Step 1405: It is determined whether or not the column name acquired at Step 1402 is included in a storage device column name list 1601 (see FIG. 16).

Step 1406: The background color of the cell chosen from the WWN list 1705 is set to color B.

Step 1407: It is determined whether or not the chosen cell is in the final column.

Step 1408: A cell advanced by one-column equivalent from the column of the chosen cell is chosen.

Step 1409: It is determined whether or not the chosen cell is in the final line.

Step 1410: A cell advanced by one-line equivalent from the column of the chosen cell is chosen.

As the processing so far described enables the display color to be altered between hypervisor information and storage information, the user's determination of the information used is facilitated.

FIG. 15 shows an example of hypervisor setting information column name list.

The hypervisor setting information column name list 1501 is information where the column name list of columns, out of the columns displayed in the WWN list 1705, into which the information acquired from a hypervisor is to be registered.

The hypervisor setting information column name list has a chassis ID 1502, a hypervisor IP address 1503, a hypervisor ID 1504, an Lpar No. 1505, a VFc ID 1506, a port No. 1507, a physical PCI No. 1508, a VFc WWN 1509 and a migration WWN 1510 as column names.

FIG. 16 shows an example of storage device column name list.

The storage device column name list 1601 is information where the column name list of columns, out of the columns displayed in the WWN list 1705, into which the information acquired from a storage is to be registered.

The storage information column name list has a storage device registration name 1602, a storage device IP address 1603, a host group port No. 1604, a host group No. 1605, a host group name 1606, a VFc WWN nickname 1607, a migration WWN nickname 1608, a VFc WWN registration status 1609 and a migration WWN registration status 1610 as column names.

FIG. 17 shows an example of migration WWN registering screen.

The migration WWN registering screen 1701 is configured of various operational buttons operable by the user with the input device 108 (Update Info button 1702, Register button 1706, Unregister button 1707 and Close button 1708), the hypervisor selection area 1703 for displaying information concerning hypervisors, the storage selection area 1704 for displaying information concerning storage devices and the WWN list 1705 for displaying related information concerning migration WWNs line by line.

When the user operates the input device 108 to choose any hypervisor in the hypervisor selection area 1703 (e.g. the hypervisor 133-1), the display control unit 112 displays in the WWN list 1705 for each logical FC-HBA port hypervisor/storage registering information 123 having the same hypervisor ID 713 as the chosen hypervisor 133-1 (e.g. VM_1. 2.3.4). It is possible to choose a plurality of hypervisors. If the user chooses the chassis 104-1, the display control unit 112 chooses all the hypervisors 133-1 to 133-N included in the chassis 104-1.

When the user operates the input device 108 to choose the storage device 181-1 in the storage device selection area 1704, the display control unit 112 displays in the WWN list 1705 the hypervisor/storage registering information 123 having the same storage device registration name 720 as the storage device registration name (e.g. STORAGE) of the chosen storage device 181-1. It is possible to choose a plurality of storage devices.

Namely, the user operates the input device 108 to acquire one or more hypervisor identifiers selectively inputted by the display control unit 112 in the hypervisor selection area 1703 and the one or more storage device identifiers selectively inputted in the storage device selection area 1704, and displays, out of the hypervisor/storage registering information 123 generated for each LPAR as shown in FIG. 13, hypervisor/storage registering information 123 including the acquired hypervisor identifiers, storages and hardware identifiers.

When the user operates the input device 108 and clicks the UpdateInfo button 1702, the display control unit 112 updates data displayed in the WWN list 1705 to the latest status. Processing at the time of updating was described with reference to FIG. 4.

When the user operates the input device 108 and clicks the Register 1706 button, the display control unit 112 processes registration of the migration WWN of the port of a line chosen in a chosen part 1731 in the WWN list 1705 (the line marked with "√"). Processing at the time of registering migration WWNs was described with reference to FIG. 5.

When the user operates the input device 108 and clicks the Unregister 1707 button, the display control unit 112 processes deletion of the migration WWN of the port of a line chosen in the chosen part 1731 in the WWN list 1705 (the line marked with "√"). Processing at the time of deleting migration WWNs was described with reference to FIG. 6.

When the user operates the input device 108 and clicks the Close button 1708, the display control unit 112 closes the migration WWN registering screen 1701.

To add, in the VFCWWN registration status 1735 and the migration WWN registration status 1737 of the displayed screen, "√" means "registered", "?", "registration status unknown" and a blank space, "unregistered".

According to the present invention, manual setting of storage management software on the basis of migration WWN information acquired with hypervisor management software among otherwise required work for migration WWN setting becomes unnecessary, and the work required for migration WWN setting can be simplified. This migration WWN setting includes registration of migration WWNs or deletion of migration WWNs.

In particular as stated already, by displaying the values of the Lpar No. 714 and of the registration status 741 of the migration WWN on the migration WWN registering screen 1701, the user is enabled to easily judge whether or not migration WWN registration is required, migration WWN can be deleted or live migration can be executed, and accordingly the work required for migration WWN setting is simplified.

Furthermore, manual migration WWN setting with storage management software involves a high risk of erroneous registration, such as inputting of a wrong WWN. Erroneous registration might invite a situation of permitting access from an unwanted LPAR. According to the invention, the risk of erroneous migration WWN registration can be reduced.

Embodiment 2

Next, an automatic migration WWN registering/deleting function will be described.

In Embodiment 1, a migration WWN has to be registered by user operation in the storage device 181 as necessary before the execution of live migration. Further to reduce security risks, the migration WWN registered in the storage device 181 has to be deleted upon completion of migration. The user should perform these two tasks consciously on any occasion of live migration.

In this embodiment, the display control unit 112 of the hypervisor management software 111 is equipped with an automatic migration WWN registering/deleting function (not shown), and the tasks of registering and deleting a migration WWN are automatically performed by this function on the occasion of migration. This enables the user to execute live migration without being conscious of the migration WWN and further simplification of the work to be realized in computer operation.

Figure 18:
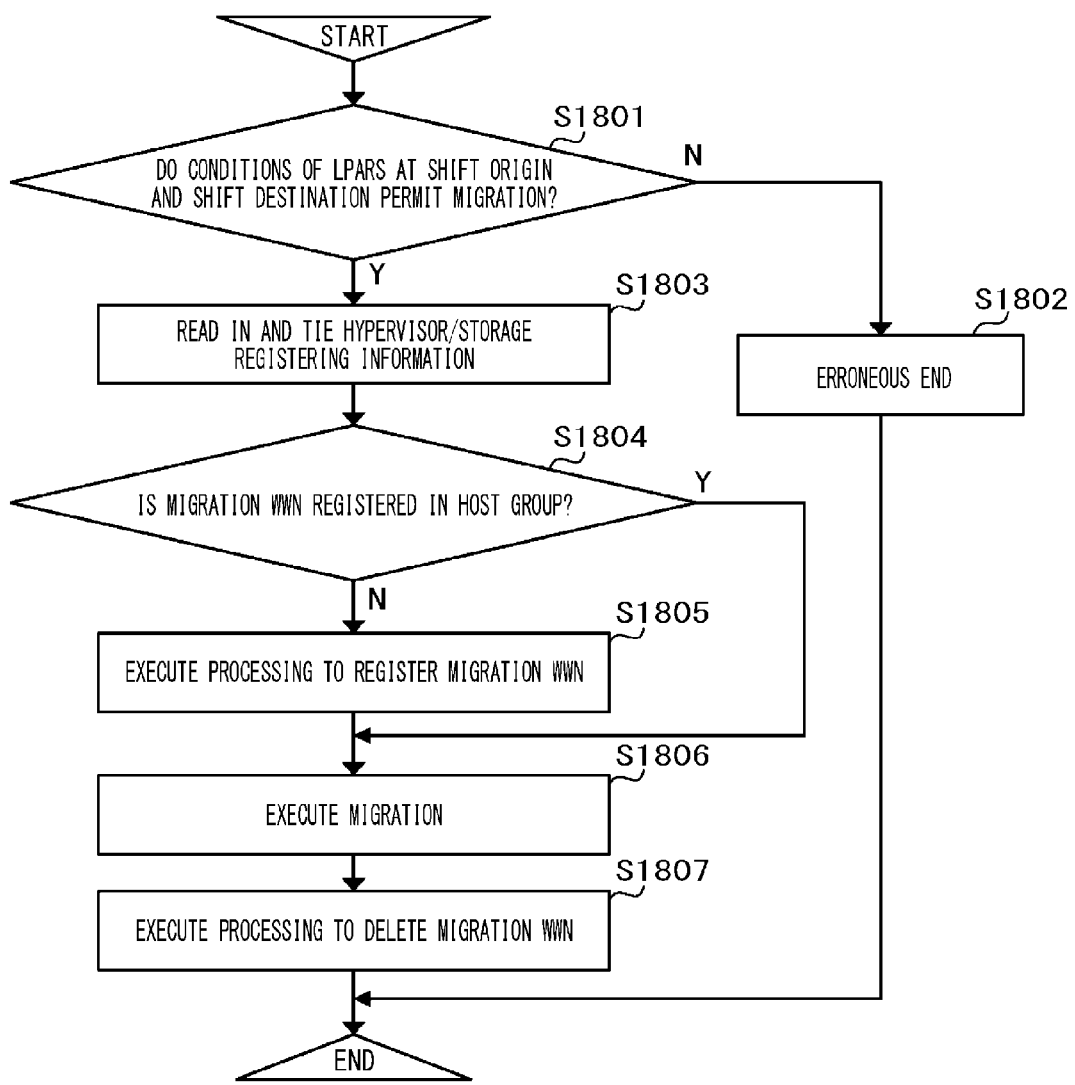
FIG. 18 is a flow chart showing processing to automatically register/delete a migration WWN in one embodiment.

FIG. 18 charts processing of the automatic migration WWN registering/deleting function (hereinafter referred to simply as the automatic function).

Step 1801: It is judged whether or not the conditions of the shift origin LPAR and the shift destination LPAR are conditions permitting live migration. These conditions include, for instance, whether or not the I/O condition and the I/O environment used by the shift origin and shift destination LPARs are the same or within a permissible range.

Step 1802: If in the judgment at Step 1801 the conditions are found unsuitable, processing of live migration is ended as error.

Step 1803: If in the judgment at Step 1801 the conditions are found suitable, the hypervisor setting information 124 and the storage device host information 125 are acquired, and processing to tie the hypervisor setting information 124 and the storage device host information 125 (see FIG. 13) is performed to generate the hypervisor/storage registering information 123.

Step 1804: The automatic function references the migration WWN registration status 741 in the hypervisor/storage registering information 123, and judges whether or not the migration WWN is registered in the host group. Thus, while the user operates the input device 108 and chooses a line on which there is the chosen part 1731 in the WWN list 1705 (the line marked with "√") of the migration WWN registering screen 1701 in Embodiment 1, in Embodiment 2 the automatic function performs choice of the line and the migration WWN registration status 741 on the line (migration WWN) 1.

Step 1805: Registration of the migration WWN is processed. This processing, performed by the user's operation of the Register button 1706 in Embodiment 1, is automatically accomplished. To add, the processing of migration WWN registration is as shown in the flow chart of FIG. 5.

Step 1806: Processing of live migration is executed.

Step 1807: Deletion of the migration WWN is processed. This processing, performed by the user's operation of the Unregister button 1707 in Embodiment 1, is automatically accomplished. To add, the processing of deletion is as shown in the flow chart of FIG. 6.

LIST OF REFERENCE SIGNS

101: Management computer
104: Chassis
105: FC-SW
111: Hypervisor management software
120: Hypervisor management software CLI
121: Storage management software CLI
131-1: First computer
131-2: Second computer
152: LU 156: Host group
181: Storage device
100-1: LPAR1
100-2: LPAR1
133-1, 133-2: Hypervisor
137-1, 137-2: Physical FC-HBA
138-1, 138-2, 138-3: Logical FC-HBA

The invention claimed is:

1. A management computing system comprising:
a management computer;
a plurality of storage devices; and
a plurality of computers that are managed by the management computer; wherein the plurality of computers includes a first computer and second computer and each of the plurality of computers includes:
a memory,
a communication interface communicatively coupled to one or more of the plurality of storage devices,
a processor communicatively coupled to the memory, and the communication interface, and
a hypervisor that utilizes the processor and the memory;
wherein the hypervisor:
forms one or more virtual computers by logically allocating resources of the processor and resources of the memory
assigns logical adapters to each of the virtual one or more computers, and
links a particular logical division with a particular logical adapter for each of the one or more virtual computers, wherein a particular virtual computer can read and write data to the particular logical division using the particular logical adapter
wherein the management computer:
acquires setting information from the hypervisor of the first computer,
determines, based on the setting information for the hypervisor, a particular storage device that stores a logical division of the first computer,
acquires host information for the particular storage device,
instructs the hypervisor of the second computer to create a new virtual computer based on the setting information from the hypervisor of the first computer,
instructs the hypervisor of the second computer to form a new logical adapter for the new virtual computer,
instructs the hypervisor of the second computer to link the new logical adapter to the logical division of the first computer, and
instructs the hypervisor of the first computer to delete the particular logical adapter that is linked to the logical division.

2. The management computing system according to claim 1,
wherein
the management computer further causes a display of each of the one or more virtual computers to display an identifier list for management information acquired by the management computer.

3. The management computing system according to claim 1, wherein the management computer instructs the hypervisor of the second computer during a live migration that is performed when the particular virtual computer is in operation.

4. The management computing system according to claim 3,
wherein the management computer further determines status information for the particular storage device wherein the live migration is performed based on the status information.

5. The management computing system of claim 1, wherein the management computer further:
references the setting information from the hypervisor or hypervisor registration information stored in the memory of the management computer,
acquires a migration identifier associated with the host information,
determines a determination result that indicates whether or not the migration identifier is among hypervisor registration information stored in the memory managed in accordance with storage device host information stored in the memory, and
causes the determination result to be displayed on a display device.

6. A method for managing a computer system, the method comprising:
forming, by a hypervisor, a first computer, one or more virtual computers by logically allocating resources of a processor of the first computer and resources of a memory of the first computer;
assigning, by the hypervisor of the first computer, logical adapters to each of the one or more virtual computers;
managing, by a management computer, logical divisions of a storage device that is communicatively coupled to the first computer, and
linking, by the hypervisor of the first computer, a particular logical division with a particular logical adapter, wherein a particular virtual computer can read and write data to the particular logical division using the particular logical adapter;
acquiring, by the management computer, setting information from the hypervisor of the first computer,
determining, by the management computer, based on the setting information for the hypervisor, a particular storage device that stores a logical division of the first computer,
acquiring, by the management computer, host information for the particular storage device,
creating, by a hypervisor of a second computer, a new virtual computer based on the setting information from the hypervisor of the first computer,
forming, by the hypervisor of the second computer, a new logical adapter for the new virtual computer,
linking, by the hypervisor of the second computer, the new logical adapter to a particular logical division of the first computer, and
deleting, by the hypervisor of the first computer, the particular logical adapter that is linked to the particular logical division.

7. The method of claim 6, further comprising:
referencing, by the management computer, the setting information from the hypervisor or hypervisor registration information stored in the memory of the management computer,
acquiring, by the management computer, a migration identifier associated with the host information,
determining, by the management computer, a determination result that indicates whether or not the migration identifier is among hypervisor registration information stored in the memory managed in accordance with storage device host information stored in the memory, and
causing, by the management computer, the determination result to be displayed on a display device.

8. A management computer comprising:
a management memory;
a management communication interface communicatively coupled to a plurality of computers that are managed by the management computer; wherein the plurality of computers includes a first computer and second computer; and
a processor communicatively coupled to the management memory and the management communication interface;
wherein each of the plurality of computers includes:
a memory,
a communication interface communicatively coupled to one or more of a plurality of storage devices,
a processor communicatively coupled to the memory, and the communication interface, and
a hypervisor that utilizes the processor and the memory;
wherein the hypervisor:
forms one or more virtual computers by logically allocating resources of the processor and resources of the memory,
assigns logical adapters to each of the one or more virtual computers,
manages logical divisions of one or more of the plurality of storage devices, and
links a particular logical division with a particular logical adapter for each of the one or more virtual computers;
wherein the processor of the management computer:
acquires setting information from the hypervisor of the first computer,
determines, based on the setting information for the hypervisor, a particular storage device that stores a logical division of the hypervisor of the first computer,
acquires host information for the particular storage device,
instructs the hypervisor of the second computer to create a new virtual computer based on the setting information from the hypervisor of the first computer,
instructs the hypervisor of the second computer to form a new logical adapter for the new virtual computer,
instructs the hypervisor of the second computer to link the new logical adapter to the logical division that is managed by the hypervisor of the first computer, and
instructs the hypervisor of the first computer to delete the particular logical adapter that is linked to the logical division.

9. The management computer of claim 8, wherein the processor of the management computer further:
references the setting information from the hypervisor or hypervisor registration information stored in the memory of the management computer,
acquires a migration identifier associated with the host information,
determines a determination result that indicates whether or not the migration identifier is among hypervisor registration information stored in the memory managed in accordance with storage device host information stored in the memory, and
causes the determination result to be displayed on a display device.

* * * * *